United States Patent
Lin et al.

(10) Patent No.: US 12,435,432 B2
(45) Date of Patent: Oct. 7, 2025

(54) BISMUTH-BASED MODIFIED ELECTRODE, MANUFACTURING METHOD THEREOF AND USE THEREOF

(71) Applicant: NATIONAL CHENG KUNG UNIVERSITY, Tainan (TW)

(72) Inventors: Chia-yu Lin, Tainan (TW); Chia-sheng Su, Tainan (TW); Chia-hui Yen, Tainan (TW); Shih-ching Huang, Tainan (TW); Wei-hsin Lu, Tainan (TW)

(73) Assignee: National Cheng Kung University, Tainan (TW)

( * ) Notice: Subject to any disclaimer, the term of this patent is extended or adjusted under 35 U.S.C. 154(b) by 426 days.

(21) Appl. No.: 17/934,541

(22) Filed: Sep. 22, 2022

(65) Prior Publication Data
US 2024/0003025 A1  Jan. 4, 2024

(30) Foreign Application Priority Data
Jul. 4, 2022 (TW) .................. 111125035

(51) Int. Cl.
| | |
|---|---|
| C25B 11/00 | (2021.01) |
| C23C 18/16 | (2006.01) |
| C23C 28/00 | (2006.01) |
| C25B 3/09 | (2021.01) |
| C25B 3/29 | (2021.01) |
| C25B 11/052 | (2021.01) |
| C25B 11/061 | (2021.01) |

(Continued)

(52) U.S. Cl.
CPC ........ *C25B 11/091* (2021.01); *C23C 18/1637* (2013.01); *C23C 18/1646* (2013.01); *C23C 28/00* (2013.01); *C25B 3/09* (2021.01); *C25B 3/295* (2021.01); *C25B 11/052* (2021.01); *C25B 11/061* (2021.01); *C25D 11/00* (2013.01)

(58) Field of Classification Search
None
See application file for complete search history.

(56) References Cited

U.S. PATENT DOCUMENTS

| | | | |
|---|---|---|---|
| 3,647,651 A | 3/1972 | Ganci et al. | |
| 9,856,567 B2 | 1/2018 | Choi et al. | |
| 2015/0361566 A1* | 12/2015 | Choi | C01G 31/00 |
| | | | 423/594.7 |

FOREIGN PATENT DOCUMENTS

| | | | | |
|---|---|---|---|---|
| CN | 108031480 A | | 5/2018 | |
| CN | 109518222 | * | 3/2019 | ............... C25B 3/25 |
| CN | 113299481 | * | 8/2021 | ............. H01G 9/042 |

OTHER PUBLICATIONS

English translation CN 108031480 (Year: 2018).*

(Continued)

*Primary Examiner* — Stefanie S Wittenberg

(57) ABSTRACT

A modified electrode, manufacturing method thereof and use thereof are provided. The manufacturing method includes steps of soaking a copper substrate in a solution to obtain a BiOI/copper(I) iodide, BiOI/copper(I) iodide/metallic bismuth, and copper(I) iodide/metallic bismuth composite modified electrodes by electroless plating method. The obtained electrodes, designated as bismuth-based modified electrode, can be used for the electrohydrodimerization of acrylonitrile to synthesize adiponitrile.

6 Claims, 32 Drawing Sheets
(1 of 32 Drawing Sheet(s) Filed in Color)

(51) Int. Cl.
    C25B 11/091    (2021.01)
    C25D 11/00     (2006.01)

(56)            References Cited

OTHER PUBLICATIONS

Zhang et al. "Formation of lattice-dislocated bismuth nanowires on copper foam for enhanced electrocatalytic CO2 reduction of low overpotential", Energy & Environmental Science, 2019, 12, 1334 (Year: 2019).*
Gan, J., et al. "Hydrogen-reduced bismuth oxyiodide nanoflake arrays with plasmonic enhancedments for efficient photoelectrochemical water reduction", Electrochimica Acta, 2016, 20-27. (Year: 2016).*
Chang et al., "Synergistic Effects of Surface Passivation and Charge Separation to Improve Photo-electrochemical Performance of BiOI Nanoflakes by Au Nanoparticle Decoration", Applied Materials & Interfaces, 2021, 13, 5721-5730. (Year: 2021).*
Cathodic Corrosion of Metal Electrodes-How to Prevent It in Electroorganic Synthesis, Chem Rev. Sep. 8, 2021; 121(17): 10241-10270, Published online Jul. 6, 2021. doi:10.1021/acs.chemrev. 1c00148.
Derek Pletcher, Zhong-Qun Tian, David E. Williams Developments in Electrochemistry: Science Inspired by Martin Fleischmann Wiley Online Library, First published: Jun. 24, 2014. [4.2. Esamples in Reductive Electroorganic Synthesis with Alloys] [p. 2227] , [p. 229].
Taiwanese Office Action issued in corresponding Taiwan Patent Application No. 111125035 dated Mar. 3, 2023, pp. 1-9.

* cited by examiner

BISMUTH-BASED MODIFIED ELECTRODE, MANUFACTURING METHOD THEREOF AND USE THEREOF

CROSS REFERENCE TO RELATED APPLICATIONS

This application claims the priority of Taiwan Patent Application No. 111125035, filed on Jul. 4, 2022, titled "BISMUTH-BASED MODIFIED ELECTRODE, MANUFACTURING METHOD THEREOF AND USE THEREOF", and the disclosure of which is incorporated herein by reference.

FIELD OF INVENTION

The present disclosure relates to the technical field of an electrode, and particularly to a bismuth-based modified electrode. The present disclosure also relates to a manufacturing method, especially a method for manufacturing the bismuth-based modified electrode. The present disclosure also relates to a use, especially a use of the bismuth-based modified electrode.

BACKGROUND OF INVENTION

At present, Nylon 6,6 has been widely used in the industries such as textiles, plastics, and automobiles. Nylon 6,6 is prepared by condensation reaction of adipic acid and hexamethylene diamine, and hexamethylene diamine is prepared by using adiponitrile as the reactant. Therefore, adiponitrile is the main reactant for Nylon 6,6 production.

The conventional synthetic methods for the production of adiponitrile include hydrocyanation of butadiene, ammoniation of adipic acid, and electro-hydrodimerization of acrylonitrile. Hydrocyanation of butadiene needs to use a large amount of hydrogen cyanide in the preparation process of adiponitrile. However, hydrogen cyanide is highly toxic, deadly, and harmful to the environment and humans. The ammoniation of adipic acid to adiponitrile is achieved by ammonia dehydration at high temperature. However, during the adiponitrile production, multiple side reactions proceed at the same time, and a variety of by-products will be produced, thereby affecting the quality and recovery of adiponitrile. In contrast to the other two methods, the current electro-hydrodimerization of acrylonitrile can be operated at ambient conditions and used water as the proton source for the synthesis of adiponitrile. However, this process uses toxic cathode materials, such as lead, cadmium, and mercury, which is toxic and harmful to the environment and human.

Therefore, it is of great importance and urgency to develop high performance electrode material that is of low toxicity, able to be easily fabricated, and efficient for the electrohydrodimerization of acrylonitrile to adiponitrile.

SUMMARY OF INVENTION

In order to solve the technical problems in the prior art described above, one object of the present disclosure is to provide a facile electroless plating method of manufacturing a bismuth-based modified electrodes, including (i) a composite modified electrode of bismuth oxyiodide (BiOI) and copper iodide (CuI), (ii) a composite modified electrode of BiOI, CuI, and metallic bismuth, and (iii) a composite modified electrode of CuI and metallic bismuth by immersing a copper substrate in an aqueous solution at ambient conditions.

Another object of the present disclosure is to provide a method of manufacturing a bismuth-based modified electrode by immersing the composite modified electrode of BiOI and CuI in an aqueous solution, followed by an electrochemical reduction process to achieve the object of rapidly manufacturing the bismuth-based modified electrode.

Yet another object of the present disclosure is to provide a bismuth-based modified electrode prepared by the electroless method of manufacturing the bismuth-based modified electrode. The bismuth-based modified electrode has a nano-sheet structure and the surface composition of the bismuth-based modified electrode comprises a combination of BiOI and CuI or a combination of BiOI, CuI, and metallic bismuth, or has a bulk structure and the surface composition of the bismuth-based modified electrode comprises a combination of BiOI and CuI. The bismuth-based modified electrode may achieve the object of synthesizing adiponitrile by the electrohydrodimerization of acrylonitrile.

Yet another object of the present disclosure is to provide a use of a bismuth-based modified electrode. The bismuth-based modified electrode, prepared with an additional electrochemical reduction process, may be used for the synthesis of adiponitrile by the electrohydrodimerization of acrylonitrile.

In order to achieve the objects described above, the present disclosure provides a method of manufacturing a bismuth-based modified electrode. The method comprises a step of immersing a copper substrate in an aqueous solution for 1 to 20 minutes to obtain the bismuth-based modified electrode. The aqueous solution comprises a bismuth solution and KI solution with a concentration between 0.4 M and 3.0 M. The bismuth solution comprises bismuth nitrate, bismuth carbonate, bismuth acetate, or bismuth citrate with a concentration between 20 mM and 40 mM.

In one embodiment, the concentration of the KI solution is 0.4 M.

In one embodiment, the bismuth solution comprises 40 mM bismuth nitrate, 20 mM bismuth carbonate, 40 mM bismuth acetate, or 40 mM bismuth citrate.

In one embodiment, the aqueous solution further comprises an oxidizing agent. The oxidizing agent comprises p-benzoquinone with a concentration between 0.5 mM and 50 mM, hydrogen peroxide with a concentration between 1 mM and 10 mM, or 2,2'-azino-bis(3-ethylbenzthiazoline-6-sulfonic acid) diammonium salt (ABTS) with a concentration between 1 mM and 10 mM.

In one embodiment, after the step of immersing the copper substrate in the aqueous solution, the method further comprises a step of immersing the copper substrate in an electrolyte with a concentration between 0.1 M and 0.5 M and a pH between 7.0 and 9.2, and performing an electroreduction reaction at an applied potential between −0.5 V and −1.75 V vs. NHE for 30 minutes to 2 hours.

In one embodiment, the copper substrate is immersed in the aqueous solution for 4 minutes.

In one embodiment, the oxidizing agent comprises 50 mM p-benzoquinone, 5 mM hydrogen peroxide, or 5 mM ABTS.

In one embodiment, the copper substrate is immersed in 0.1 M borate buffer, pH 9.2.

In one embodiment, the electroreduction reaction is performed at the applied potential at −1.745 V vs. NHE for 30 minutes.

The present disclosure further provides a bismuth-based modified electrode prepared by the method described above. A surface of the bismuth-based modified electrode has CuI and metallic bismuth. The diffraction peaks at diffraction angles (2θ) of 25.5° and 42.3° are assigned to CuI, whereas those at 27.2°, 37.9°, and 39.6° are assigned to the metallic bismuth.

In one embodiment, the surface of the bismuth-based modified electrode has a combination of CuI and metallic bismuth, a combination of CuI and BiOI, or a combination of CuI, BiOI, and metallic bismuth. The diffraction peaks at diffraction angles (2θ) of 25.5° and 42.3° are assigned to CuI. The diffraction peaks at 27.2°, 37.9°, and 39.6° are assigned to the metallic bismuth. The diffraction peaks at 31.7° and 45.4° are assigned to BiOI.

In one embodiment, a surface of the bismuth-based modified electrode has a nanosheet structure and metallic bismuth with diffraction peaks at diffraction angles (2θ) of 27.2°, 37.9°, and 39.6°.

The present disclosure further provides a use of the bismuth-based modified electrode described above, and the bismuth-based modified electrode is used for the synthesis of adiponitrile via the electrohydrodimerization of acrylonitrile.

The present disclosure may easily and quickly manufacture a bismuth-based modified electrode having a nano-sheet structure with low toxicity and large area by electroless plating, and the composition of the deposits may be changed by adjusting the concentration of the oxidizing agent in which the copper substrate is immersed. For example, when the concentration of p-benzoquinone is greater than 10 mM, the surface of the bismuth-based modified electrode has CuI and BiOI. When the concentration of p-benzoquinone is equal to 10 mM, the surface of the bismuth-based modified electrode has CuI, BiOI, and metallic bismuth. When the concentration of p-benzoquinone is between 0.1 mM and 9 mM, the surface of the bismuth-based modified electrode has CuI and metallic bismuth. In addition, CuI and BiOI may also be formed on the surface of the bismuth-based modified electrode by immersing the copper substrate in the aqueous solution containing the oxidizing agent for 1 to 20 minutes. Furthermore, the bismuth-based modified electrode prepared by the present disclosure may be used for the synthesis of adiponitrile via the electrohydrodimerization of acrylonitrile. The present disclosure may solve the problem that the toxic lead and cadmium electrode materials must be used in the prior art.

BRIEF DESCRIPTION OF DRAWINGS

In order to explain the technical solutions of the present disclosure more clearly, the following will briefly introduce the drawings used in the description of the embodiments or the related art. Obviously, the drawings described below are only some embodiments of the present disclosure. For those skilled in the art, other drawings can be obtained based on these drawings without making creative efforts. The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

The following describes the embodiment of the present disclosure through specific examples. Those skilled in the field can understand other advantages and effects of the present disclosure from the content disclosed in the present specification. However, the exemplary embodiments disclosed in the present disclosure are merely for illustrative purposes and should not be construed as a limiting the scope of the present disclosure. In other words, the present disclosure can also be implemented or applied by other different specific embodiments, and various details in the present specification can also be modified and changed based on different viewpoints and applications without departing from the concept of the present disclosure.

Unless otherwise described herein, the singular forms "a" and "the" used in the specification and the appended claims of the present disclosure comprise plural entities. Unless otherwise described herein, the term "or" used in the specification and the appended claims of the present disclosure comprises the meaning of "and/or".

Preparation Example 1: Preparation of a First Electrode

The copper substrate is immersed in an electroplating solution containing 0.1 M $Pb(NO_3)_2$ and 0.1 M $H_3BO_3$, a current density of −20 $mA/cm^2$ is applied, and electrodeposition is performed for 75 seconds to obtain an electroplated lead film modified electrode (i.e., a Pb/Cu electrode). The electroplated lead film modified electrode is immersed in a mixed solution containing 0.5 M sodium phosphate (pH 8) and 30 mM tetrabutylammonium phosphate and the reduction pretreatment is performed by cyclic voltammetry to remove the lead oxide film on the surface of the electroplated lead film modified electrode, and obtain a reduction pretreated lead film modified electrode (i.e., a first electrode).

Figure 1A:
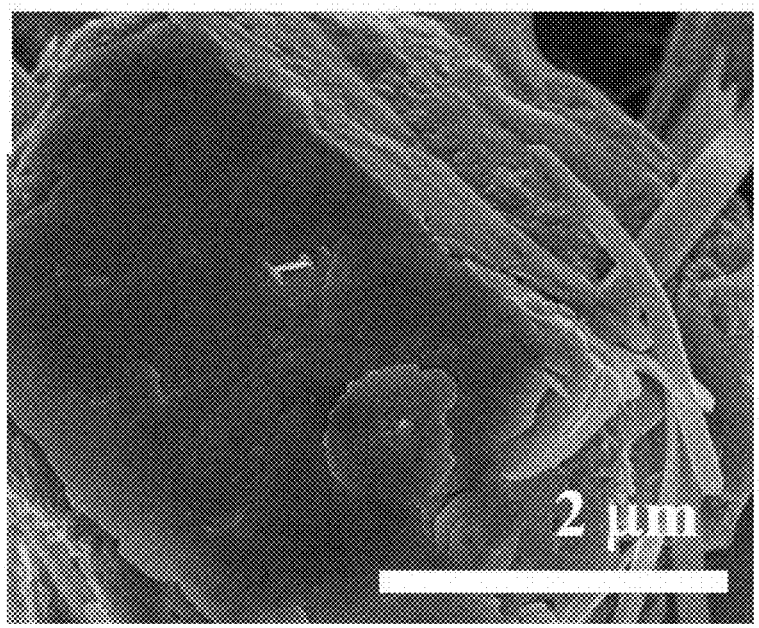
FIG. 1A and FIG. 1B respectively show the result of a surface morphology of a Pb/Cu electrode of Preparation Example 1 of the present disclosure. The scale bars of FIG. 1A and FIG. 1B are 2 μm and 10 μm, respectively.
Figure 1B:
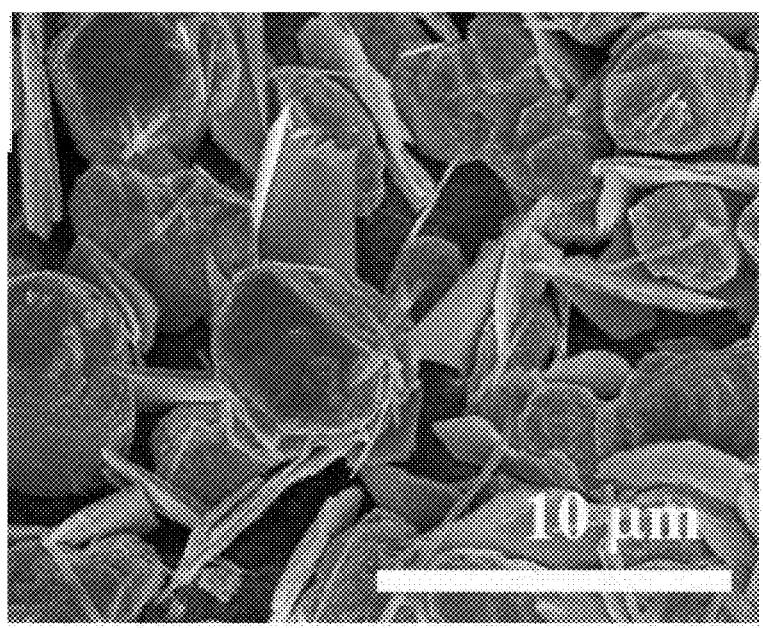
Figure 1C:
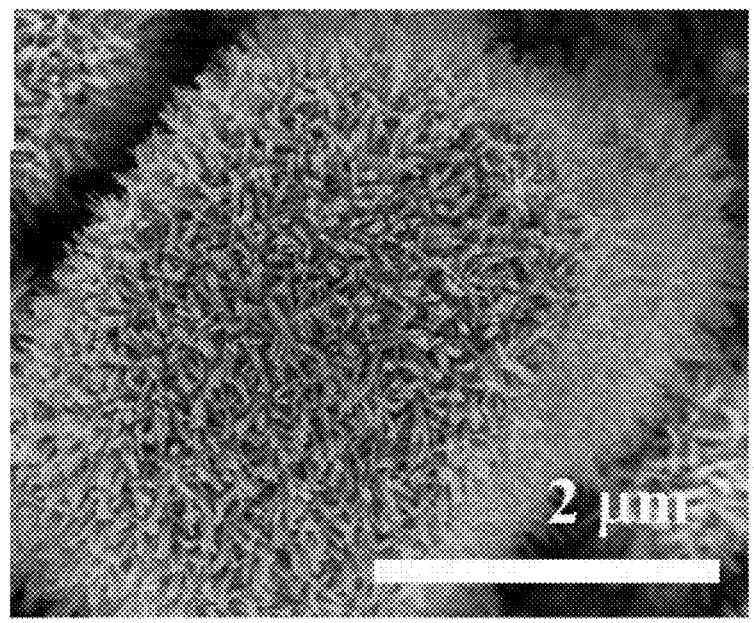
FIG. 1C and FIG. 1D respectively show the result of a surface morphology of a first electrode of Preparation Example 1 of the present disclosure. The scale bars of FIG. 1C and FIG. 1D are 2 μm and 10 μm, respectively.
Figure 1D:
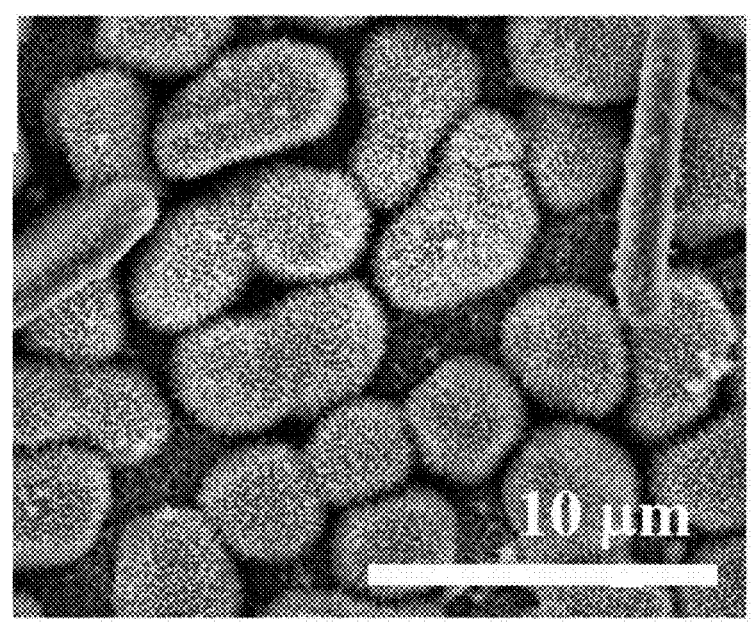

The surface morphologies of the Pb/Cu electrode and the first electrode are analyzed by a scanning electron microscope (SEM) (Hitachi SU-8010). Referring to FIG. 1A and FIG. 1B, the results show that there are granular catalysts larger than 2 μm in diameter deposited on the surface of the Pb/Cu electrode, and some granular catalysts have a microsheet structure. Referring to FIG. 1C and FIG. 1D, the results show that the surface of the first electrode consists of nanorods.

Figure 1E:
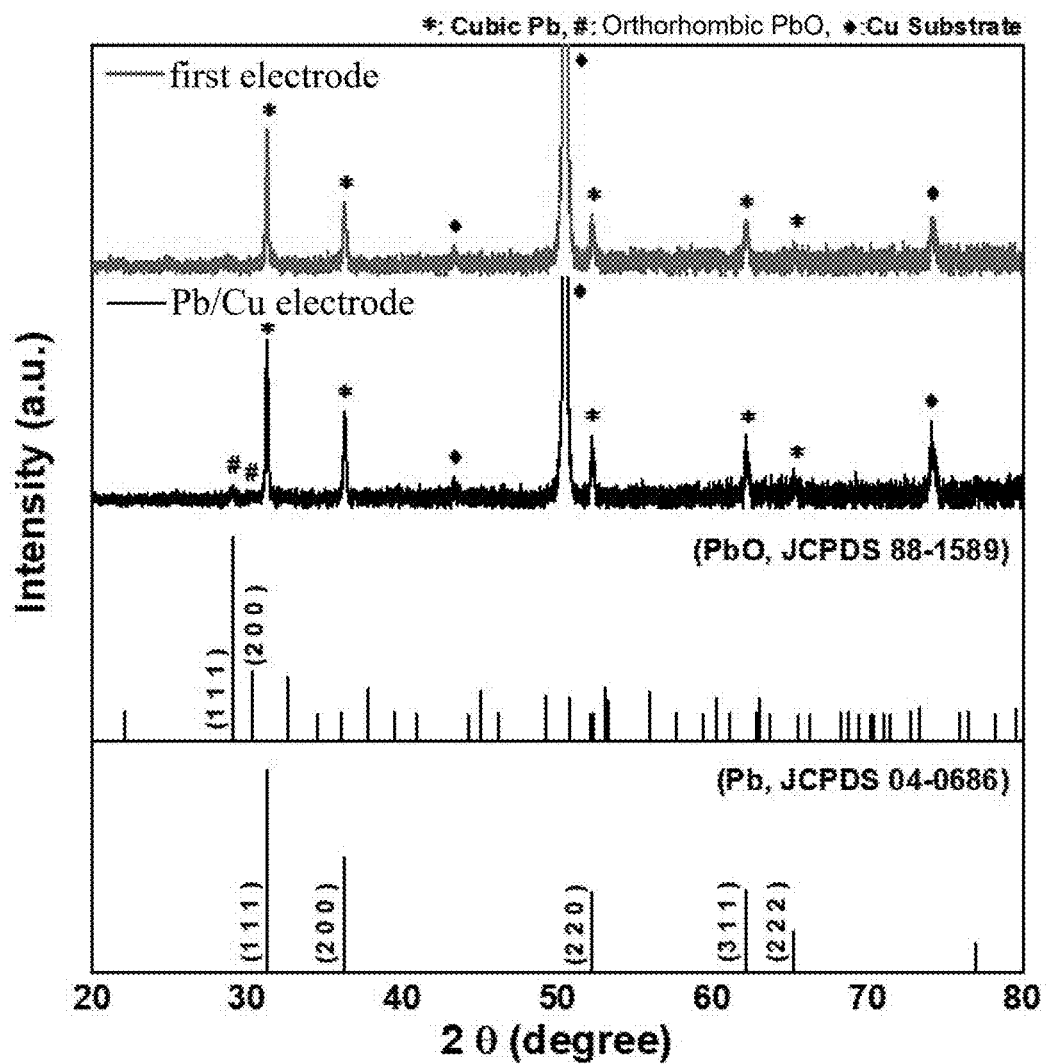
FIG. 1E shows the results of X-ray diffraction patterns of the Pb/Cu electrode and the first electrode of the Preparation Example 1 of the present disclosure.

The crystal planes of the Pb/Cu electrode and the first electrode are analyzed by X-ray diffraction (XRD). Referring to FIG. 1E, the result shows that the first electrode having a highly crystalline structure may be obtained after the reduction pretreatment of the Pb/Cu electrode.

Preparation Example 2: Preparation of a Second Electrode

The copper substrate is immersed in an electroplating solution containing 30 mM $Bi(NO_3)_3$ and 1 M $HNO_3$, a current density of −5 mA/cm² is applied, and electrodeposited is performed for 300 seconds to obtain an electroplated bismuth film modified electrode (i.e., a second electrode).

Figure 2A:
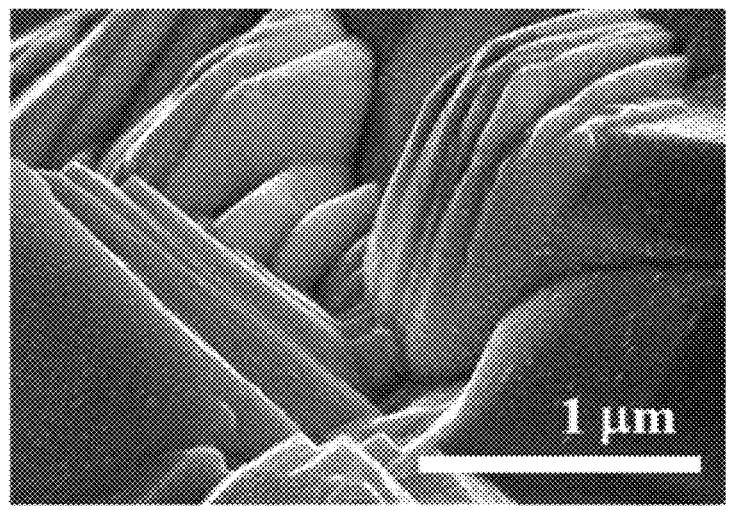
FIG. 2A shows the result of a surface morphology of a second electrode of Preparation Example 2 of the present disclosure.

The surface morphology of the second electrode is analyzed by SEM (Hitachi SU-8010) to analyze. Referring to FIG. 2A, the result shows that the surface of the second electrode has a morphology with a hexagonal shape which is stacked in a stepped structure.

Figure 2B:
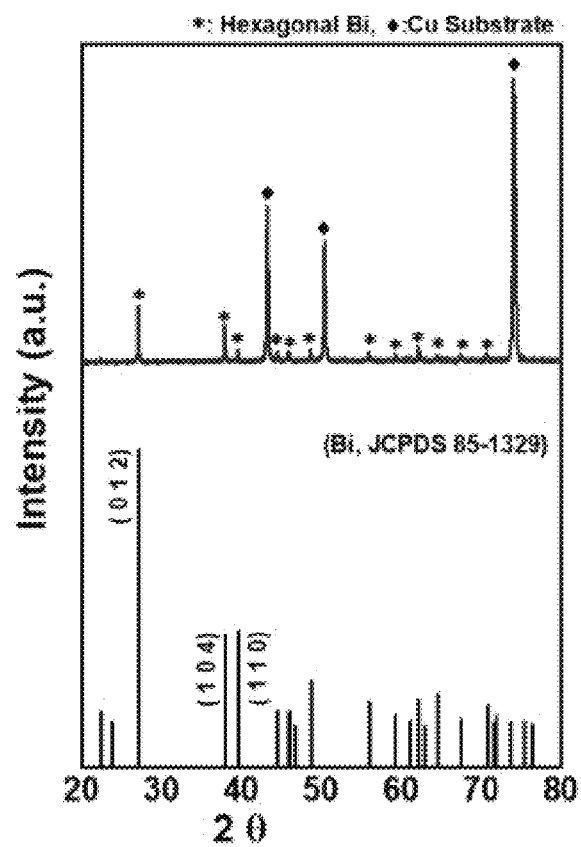
FIG. 2B shows the result of X-ray diffraction pattern of the second electrode of the Preparation Example 2 of the present disclosure.

The crystal plane of the second electrode is analyzed by XRD (RIGAKU, UltimaIV). Referring to FIG. 2B, the result shows that the second electrode has a highly crystalline structure, and no characteristic peak of bismuth oxide is detected.

Preparation Example 3: Preparation of a Third Electrode by the Electrodeposition Method The copper substrate is immersed in an electroplating solution containing 40 mM $Bi(NO_3)_3$, 0.4 M KI, and 50 mM p-benzoquinone, and electrodeposition is performed at a constant potential of −0.1 V vs. Ag/AgCl for 4 minutes to obtain a BiOI modified electrode with a nanosheet structure (i.e., a $BiOI_{EP}$/Cu electrode). The BiOI modified electrode is immersed in 0.1 M boric acid buffer (pH 9.2) and subjected to a electrochemical reduction process at an applied potential of −1.745 V vs. NHE for 30 minutes to obtain a bismuth-based modified electrode with a nanosheet structure (i.e., a third electrode).

Figure 3A:
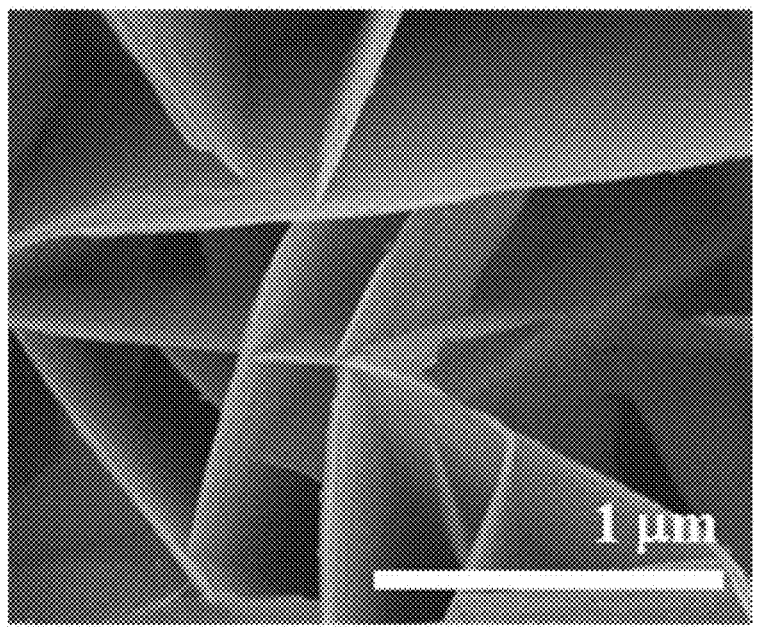
FIG. 3A and FIG. 3B respectively show the result of a surface morphology of a $BiOI_{EP}$/Cu electrode of Preparation Example 3 of the present disclosure. The scale bars of FIG. 3A and FIG. 3B are 1 μm and 2 μm, respectively.
Figure 3B:
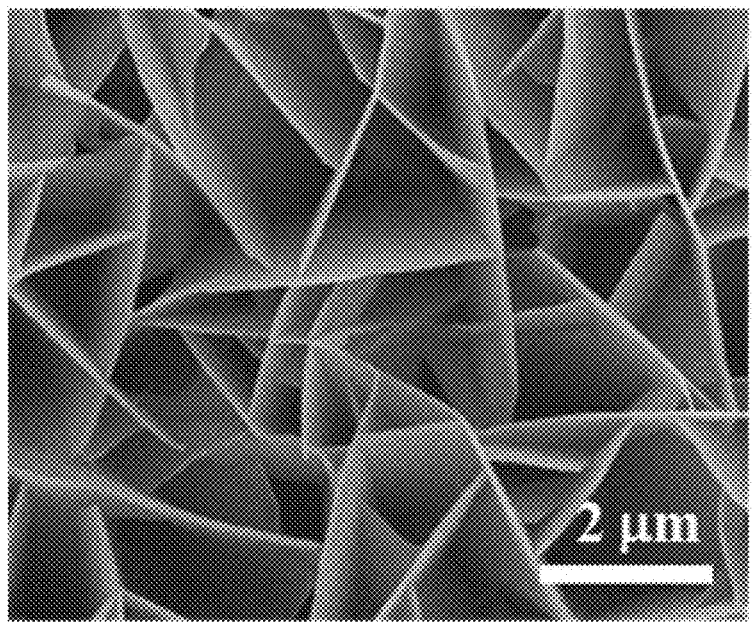
Figure 3C:
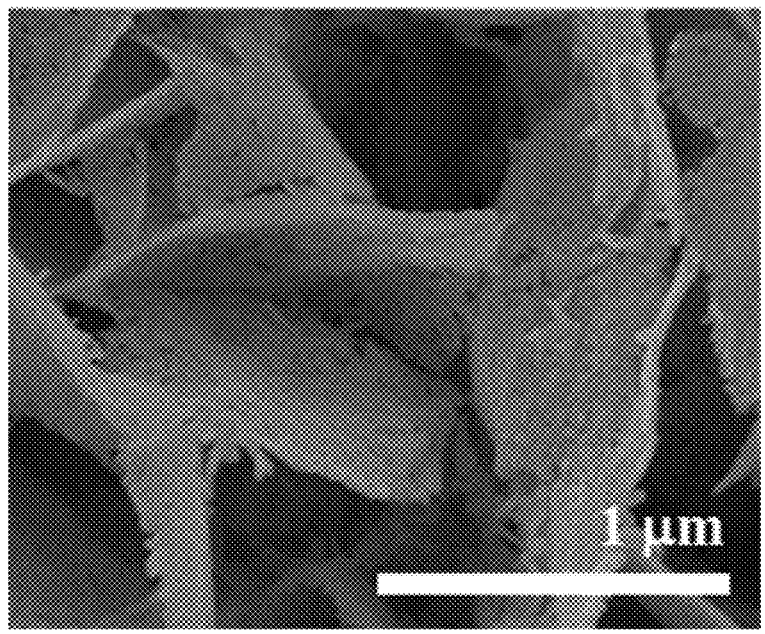
FIG. 3C and FIG. 3D respectively show the result of a surface morphology of a third electrode of Preparation Example 3 of the present disclosure. The scale bars of FIG. 3C and FIG. 3D are 1 μm and 2 μm, respectively.
Figure 3D:
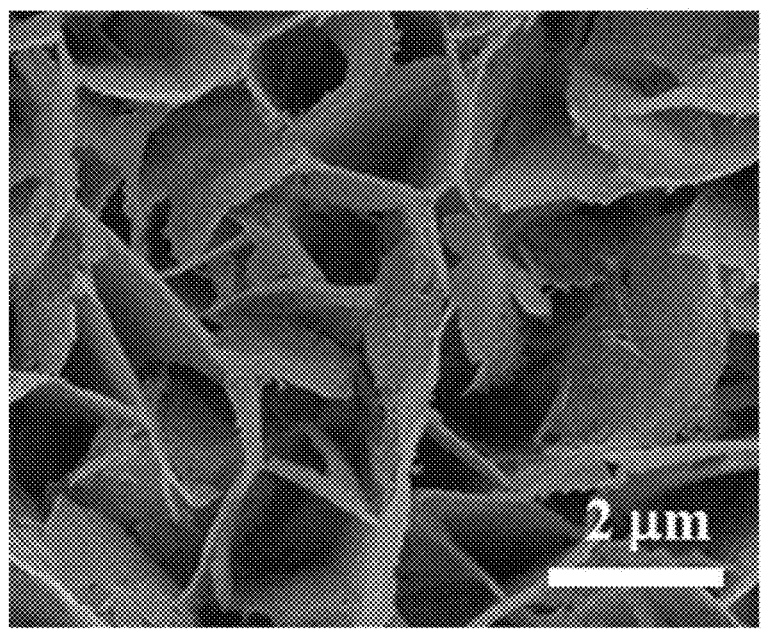

The surface morphology of the $BiOI_{EP}$/Cu electrode and the third electrode are analyzed by SEM (Hitachi SU-8010). Referring to FIG. 3A and FIG. 3B, the results show that the surface of $BiOI_{EP}$/Cu electrode has a nanosheet structure. Referring to FIG. 3C and FIG. 3D, the results show that after reduction pretreatment, the surface of the third electrode still has a sheet structure.

Figure 3E:
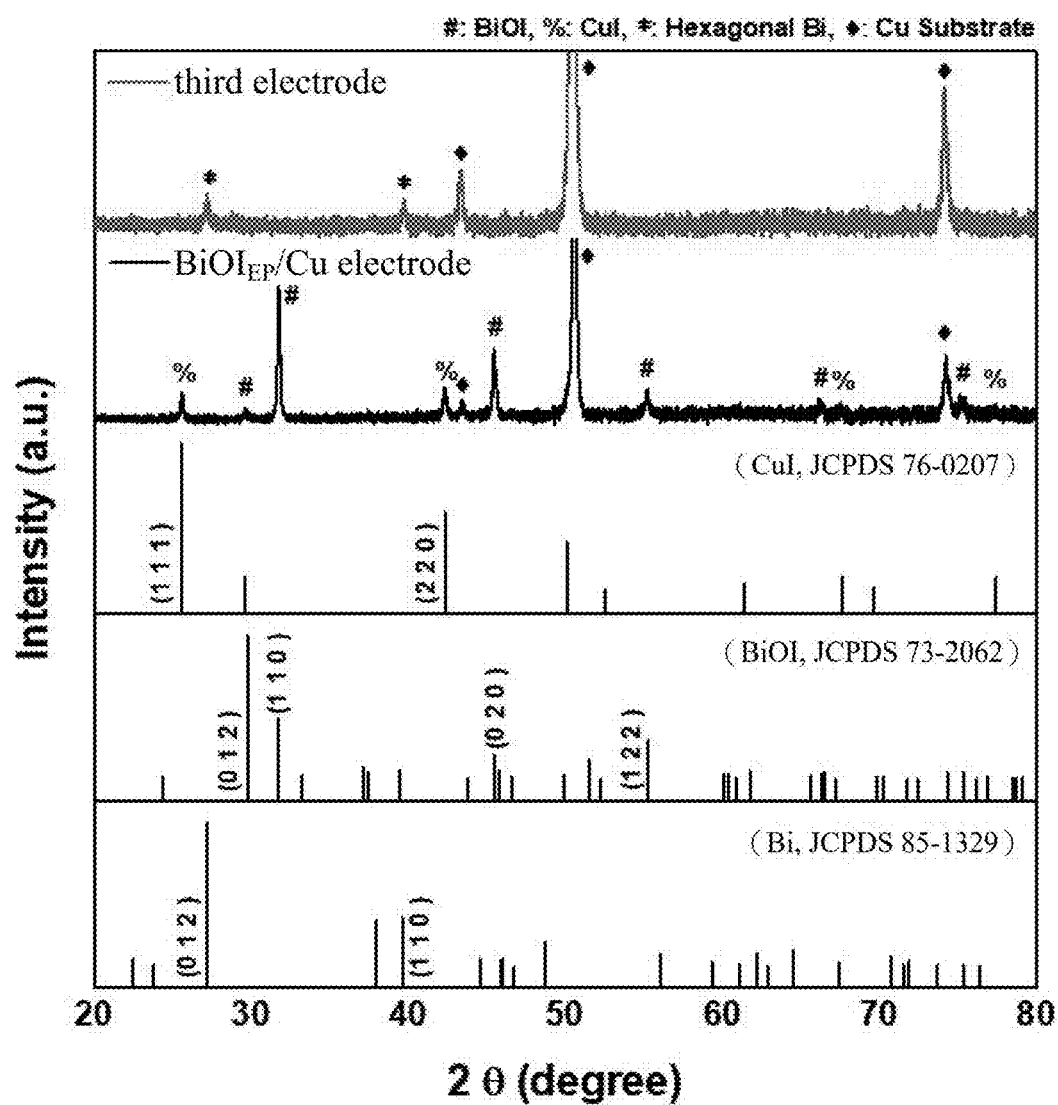
FIG. 3E shows the result of X-ray diffraction pattern of the $BiOI_{EP}$/Cu electrode and the third electrode of the Preparation Example 3 of the present disclosure.

The crystal planes of the $BiOI_{EP}$/Cu electrode and the third electrode are analyzed by XRD. Referring to FIG. 3E, the result shows that the $BiOI_{EP}$/Cu electrode may be completely converted to form a bismuth-based modified electrode (i.e., the third electrode) with a nanosheet structure after reduction pretreatment.

Preparation Example 4: Preparation of a Fourth Electrode by Electroless Plating Method The copper substrate is immersed in an aqueous solution containing 40 mM $Bi(NO_3)_3$, 0.4 M KI, and 50 mM p-benzoquinone for 4 minutes to obtain a composite modified electrode containing BiOI and CuI with a nanosheet structure (i.e., the fourth electrode).

Figure 4A:
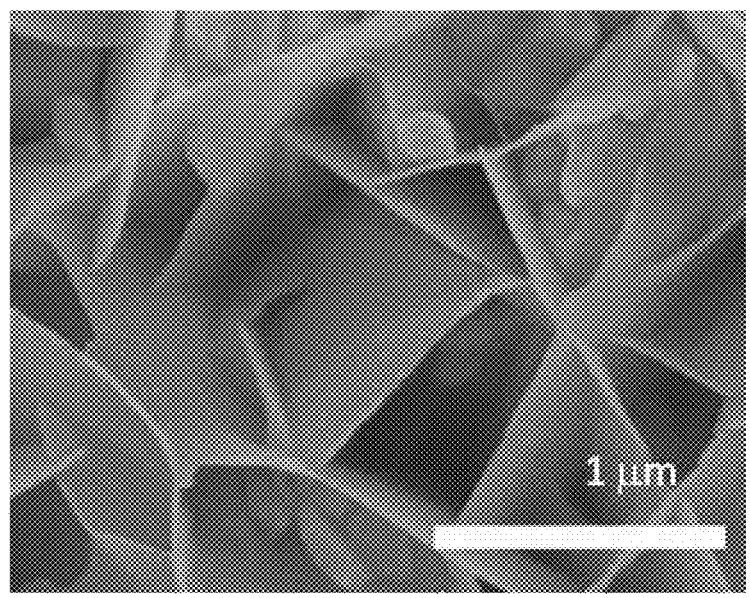
FIG. 4A and FIG. 4B respectively show the result of a surface morphology of a fourth electrode of Preparation Example 4 of the present disclosure. The scale bars of FIG. 4A and FIG. 4B are 1 μm and 2 μm, respectively.
Figure 4B:
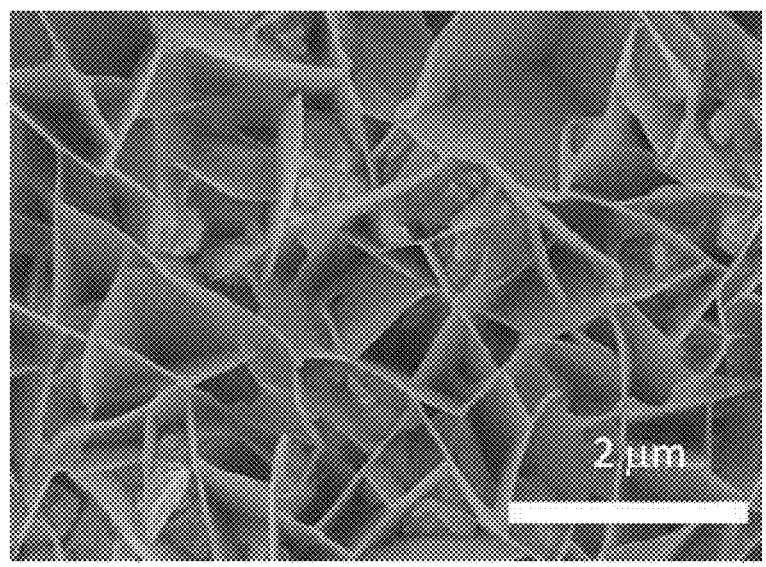

The surface morphology of the fourth electrode is analyzed by SEM (Hitachi SU-8010). Referring to FIG. 4A and FIG. 4B, the results show that the surface of the fourth electrode has a nanosheet structure and nanoparticles dispersed on the nanosheet structure.

Figure 5A:
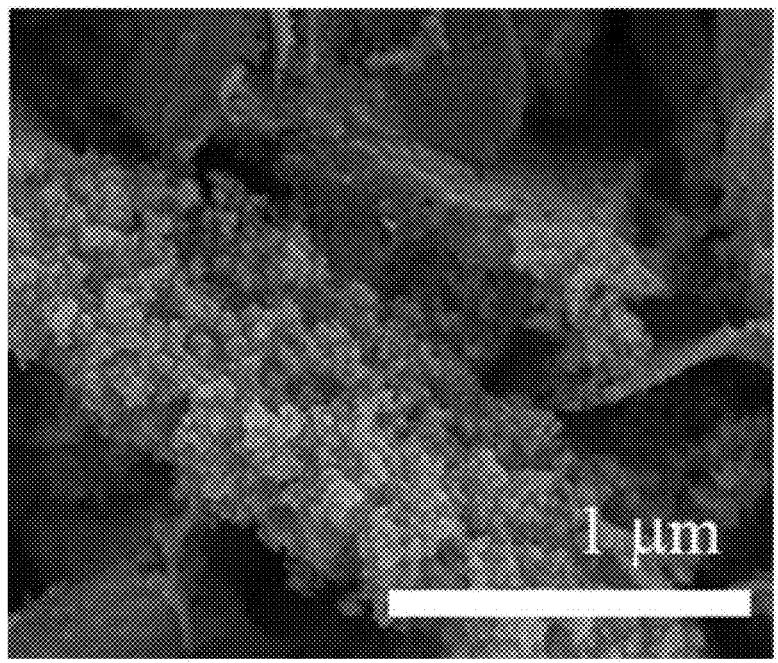
FIG. 5A and FIG. 5B respectively show the result of a surface morphology of a fifth electrode of Preparation Example 5 of the present disclosure. The scale bars of FIG. 5A and FIG. 5B are 1 μm and 2 μm, respectively.
Figure 5B:
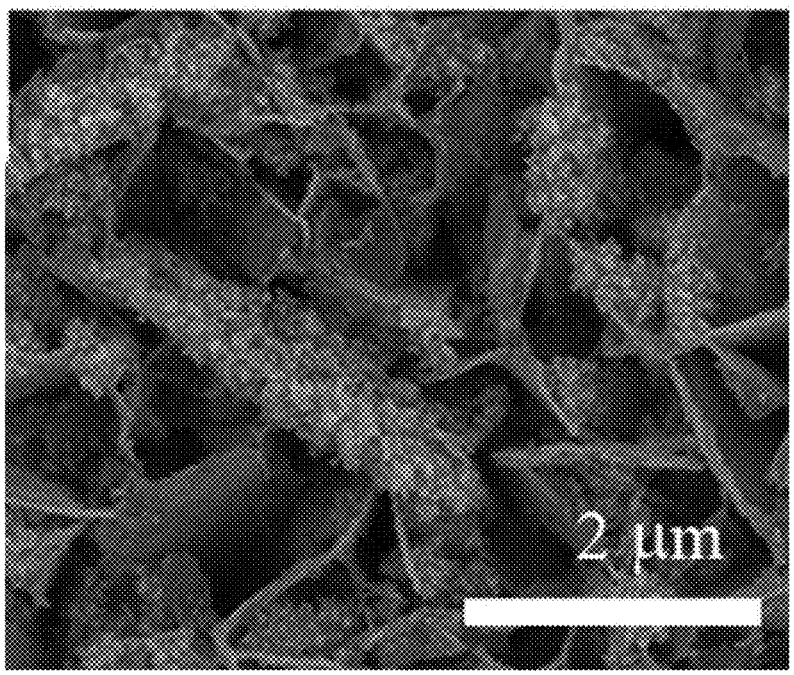
Figure 5C:
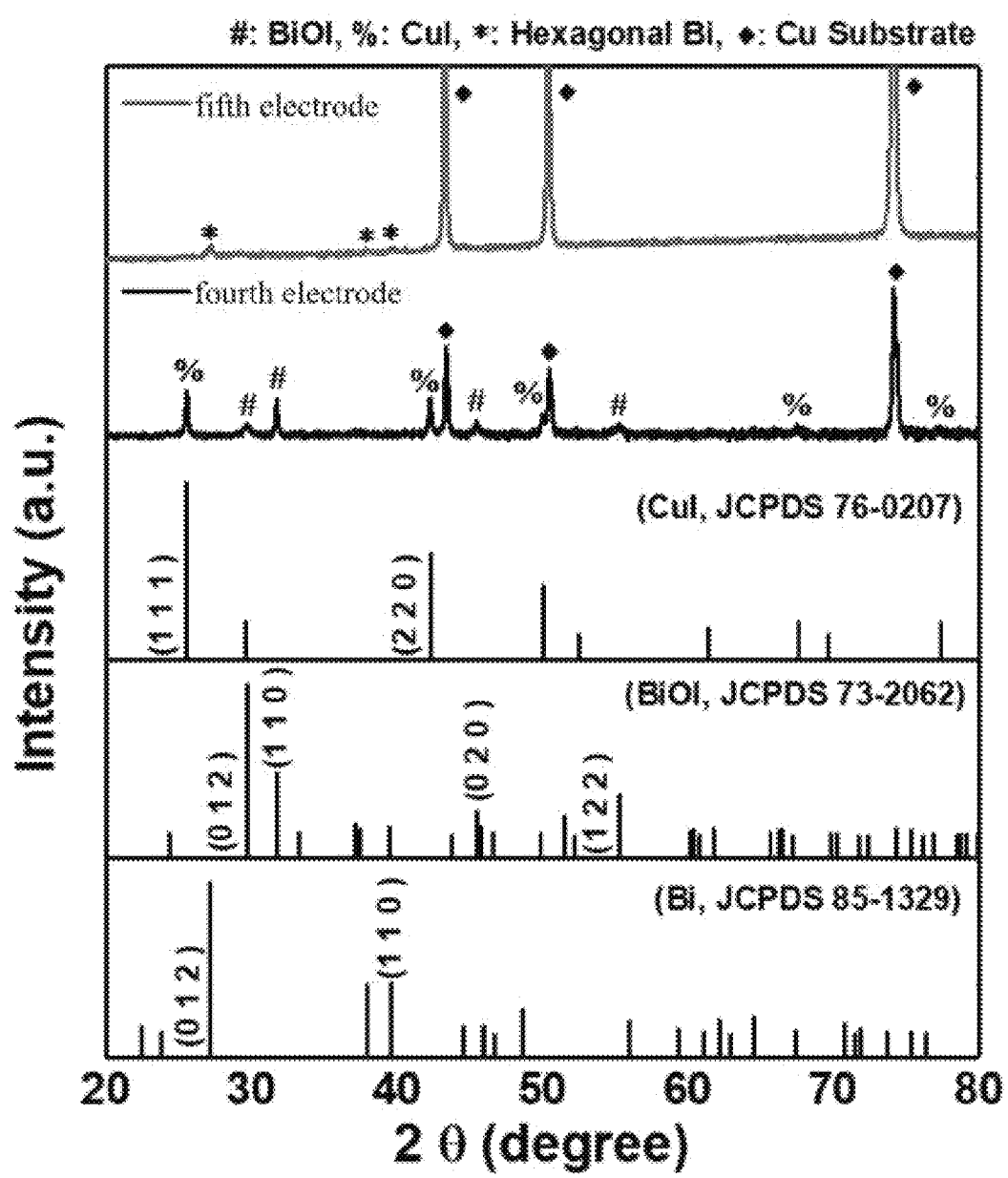
FIG. 5C shows the result of X-ray diffraction pattern of the fifth electrode of Preparation Example 5 of the present disclosure.

The crystal plane of the fourth electrode is analyzed by XRD. Referring to FIG. 5C, the result shows that the fourth electrode has characteristic peaks of CuI and BiOI. In addition, the content percentages of CuI and BiOI deposited on the surface of the fourth electrode analyzed by analysis software of XRD are shown in Table 1.

TABLE 1

| Chemical composition of the fourth electrode | | | | |
|---|---|---|---|---|
| | Content (%) | | | |
| | copper | CuI | BiOI | metallic bismuth |
| fourth electrode | 69.4 | 20.4 | 10.2 | 0 |

Preparation Example 5: Preparation of a Fifth Electrode by Electrochemical Reduction Method The fourth electrode is immersed in a 0.1 M boric acid buffer (pH 9.2), and a reduction reaction is performed at an applied potential of −1.745 V vs. NHE for 30 minutes to obtain a bismuth-based modified electrode containing metallic bismuth with a nano-sheet structure (i.e., the fifth electrode).

The surface morphology of the fifth electrode is analyzed by SEM (Hitachi SU-8010). Referring to FIG. 5A and FIG. 5B, the results show that the surface of the fifth electrode still has a nanosheet structure after the electrochemical reduction pretreatment.

The crystal plane of the fifth electrode is analyzed by XRD. Referring to FIG. 5C, the result shows that the fifth electrode may be completely converted to form a bismuth-based modified electrode containing metallic bismuth with a nanosheet structure (i.e., the fifth electrode) after reduction pretreatment. The X-ray diffraction pattern of the bismuth-based modified electrode has characteristic peaks of hexagonal bismuth at diffraction angles (2θ) of 27.2°, 37.9°, and 39.6°.

Preparation Example 6: Preparation of a Sixth Electrode by Electroless Plating Method The copper substrate is immersed in an aqueous solution containing 20 mM bismuth carbonate ($Bi_2O_2(CO_3)$), 0.4 M KI, and 50 mM p-benzoquinone for 4 minutes to obtain a bismuth-based modified electrode with a nanosheet structure and (i.e., the sixth electrode). The composition on the surface of the sixth electrode comprises BiOI and CuI.

Figure 6A:
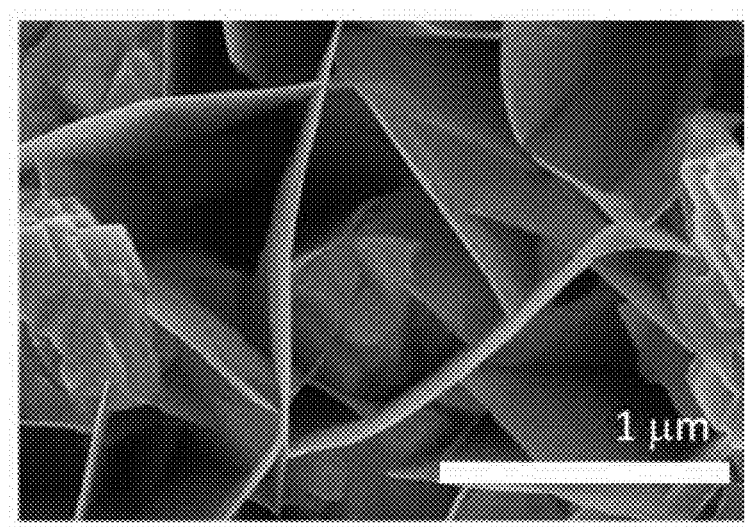
FIG. 6A and FIG. 6B respectively show the result of a surface morphology of a sixth electrode of Preparation Example 6 of the present disclosure. The scale bars of FIG. 6A and FIG. 6B are 1 μm and 5 μm, respectively.
Figure 6B:
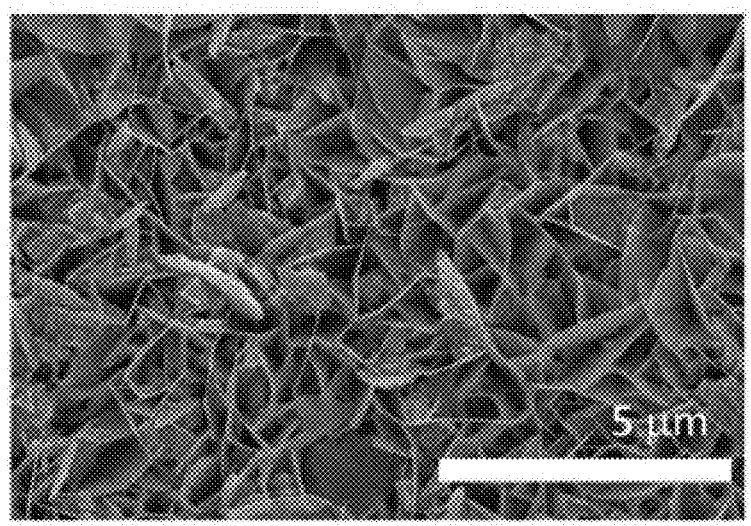

The surface morphology of the sixth electrode is analyzed by SEM (Hitachi SU-8010). Referring to FIG. 6A and FIG. 6B, the results show that the surface of the sixth electrode has a nanosheet structure.

Figure 6C:
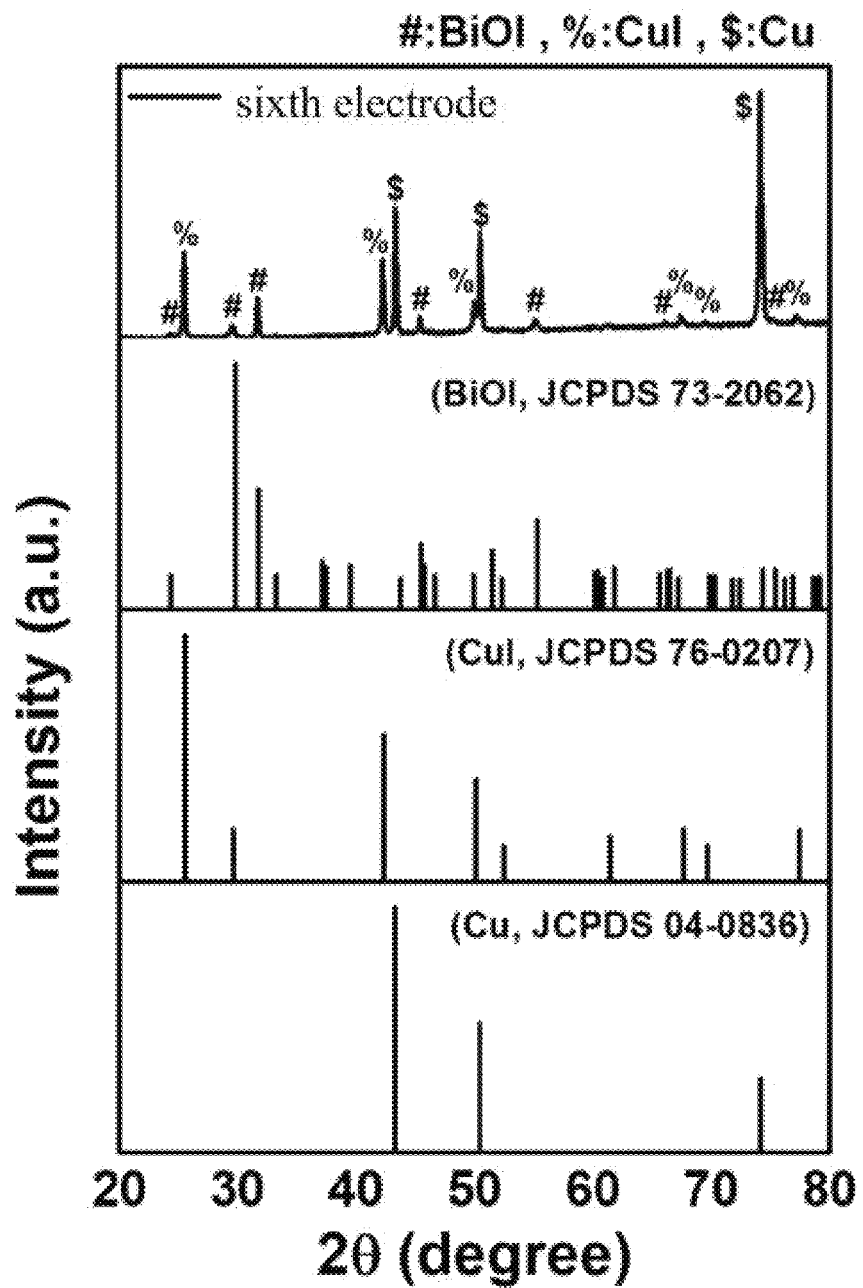
FIG. 6C shows the result of X-ray diffraction pattern of the sixth electrode of Preparation Example 6 of the present disclosure.

The crystal plane of the sixth electrode is analyzed by XRD. Referring to FIG. 6C, the result shows that the sixth electrode has characteristic peaks of BiOI and CuI.

Preparation Example 7: Preparation of a Seventh Electrode by Electroless Plating Method The copper substrate is immersed in an aqueous solution containing 40 mM bismuth acetate ($Bi(CH_3COO)_3$), 0.4 M KI, and 50 mM p-benzoquinone for 4 minutes to obtain a bismuth-based modified electrode with a nanosheet structure (i.e., the seventh electrode). The composition on the surface of the seventh electrode comprises BiOI and CuI.

Figure 7A:
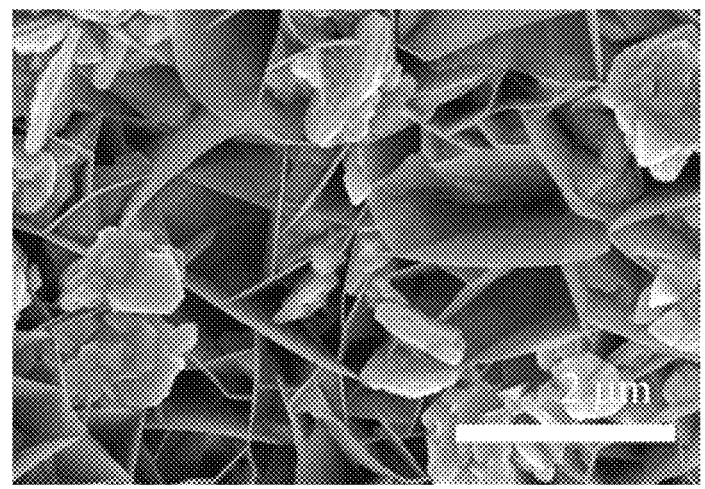
FIG. 7A shows the result of a surface morphology of a seventh electrode of Preparation Example 7 of the present disclosure.

The surface morphology of the seventh electrode is analyzed by SEM (Hitachi SU-8010). Referring to FIG. 7A, the result shows that the surface of the seventh electrode has a nanosheet structure.

Figure 7B:
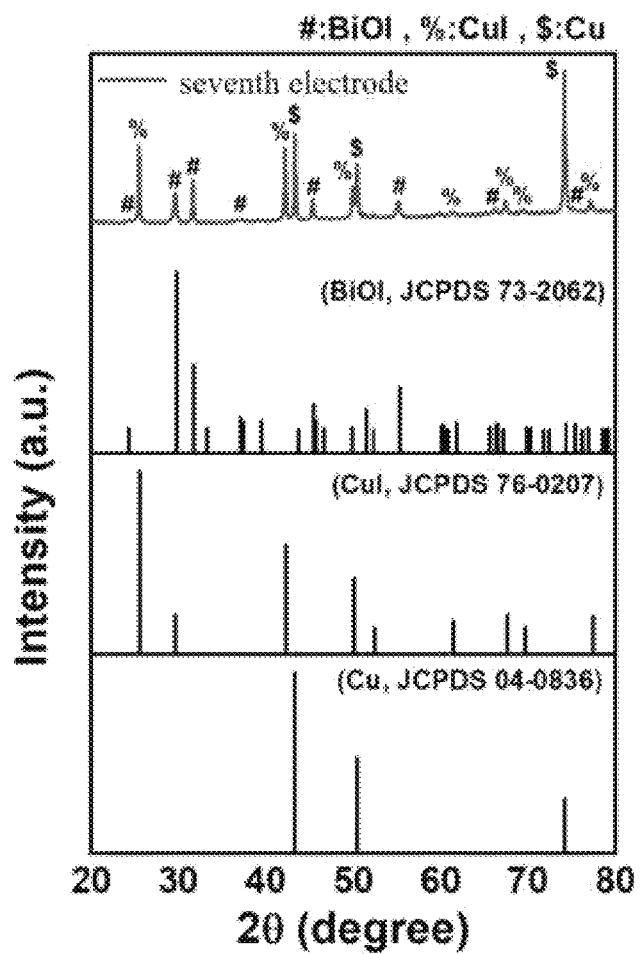
FIG. 7B shows the result of X-ray diffraction pattern of the seventh electrode of Preparation Example 7 of the present disclosure.

The crystal plane of the seventh electrode is analyzed by XRD. Referring to FIG. 7B, the result show that the seventh electrode has characteristic peaks of BiOI and CuI.

Preparation Example 8: Preparation of an Eighth Electrode by Electroless Plating Method The copper substrate is immersed in an aqueous solution containing 40 mM bismuth citrate ($C_6HSBiO_7$), 0.4 M KI, and 50 mM p-benzoquinone for 4 minutes to obtain a bismuth-based modified electrode with a nanosheet structure (i.e., the eighth electrode). The composition on the surface of eighth electrode comprises BiOI and CuI.

Figure 8A:
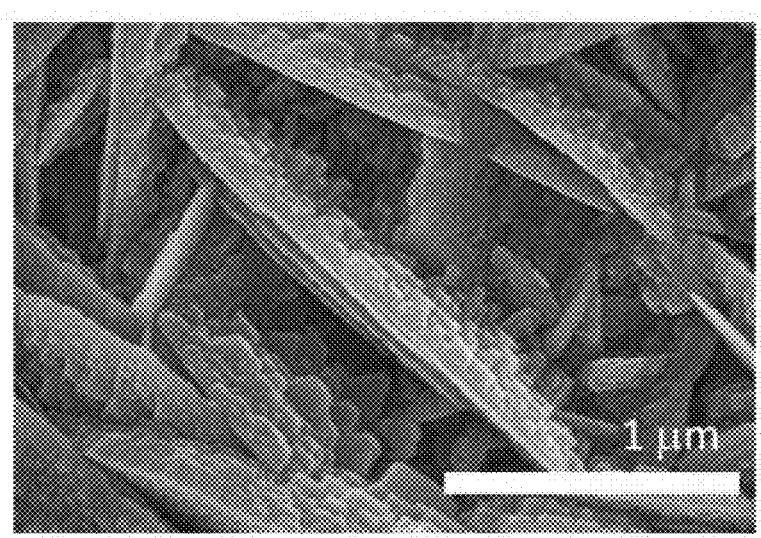
FIG. 8A and FIG. 8B respectively show the result of a surface morphology of an eighth electrode of Preparation Example 8 of the present disclosure. The scale bars of FIG. 8A and FIG. 8B are 1 μm and 5 μm, respectively.
Figure 8B:
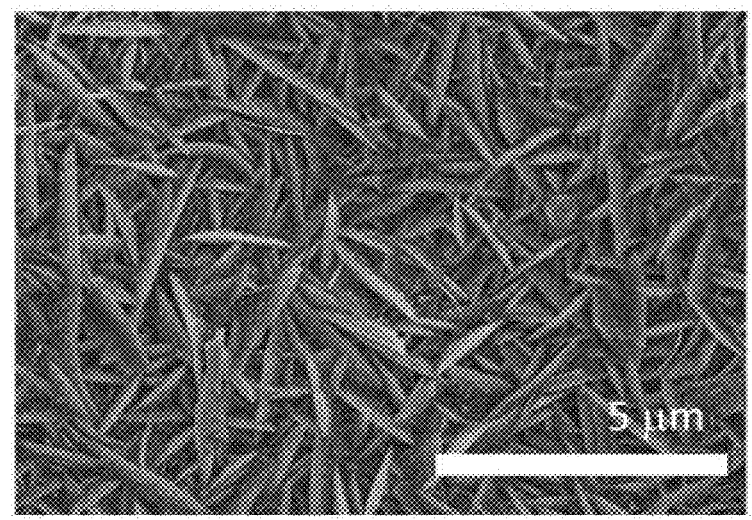

The surface morphology of the eighth electrode is analyzed by SEM (Hitachi SU-8010). Referring to FIG. 8A and FIG. 8B, the results show that the surface of the eighth electrode has a nanosheet structure.

Figure 8C:
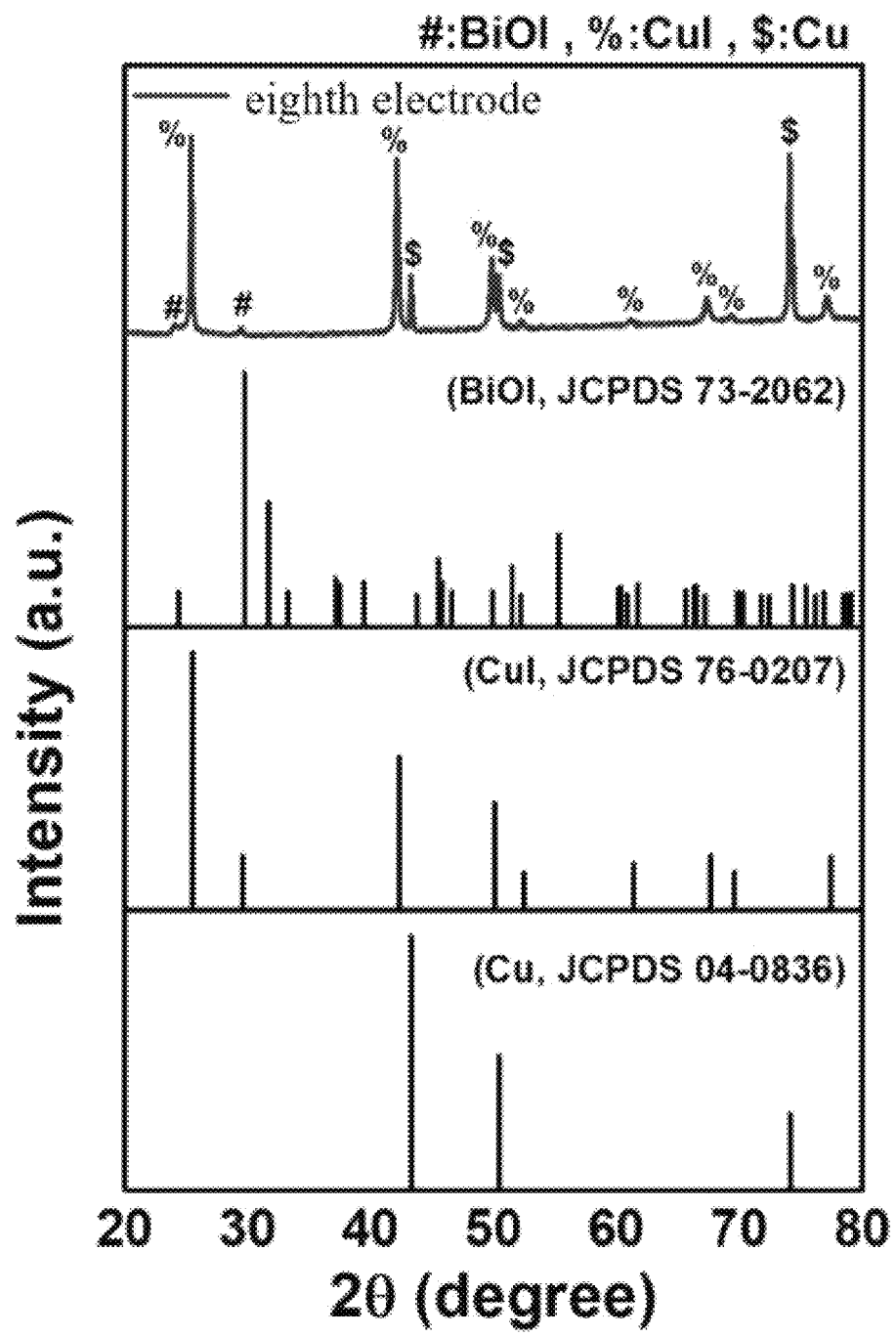
FIG. 8C shows the result of X-ray diffraction pattern of the eighth electrode of Preparation Example 8 of the present disclosure.

The crystal plane of the eighth electrode is analyzed by XRD. Referring to FIG. 8C, the result shows that the eighth electrode has characteristic peaks of BiOI and CuI.

Preparation Example 9: Preparation of a Ninth Electrode by Electroless Plating Method The copper substrate is immersed in an aqueous solution containing 40 mM $Bi(NO_3)_3$, 0.4 M KI, and 5 mM $H_2O_2$ for 4 minutes to obtain a bismuth-based modified electrode containing CuI and metallic bismuth (i.e., the ninth electrode).

Figure 9A:
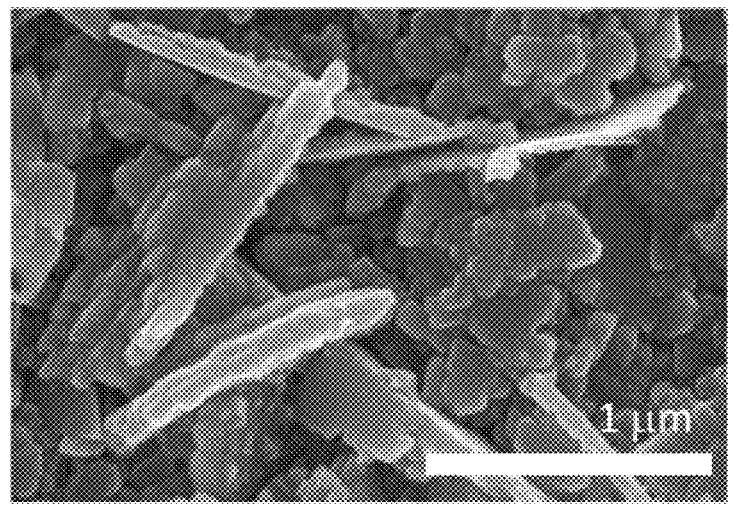
FIG. 9A and FIG. 9B respectively show the result of a surface morphology of a ninth electrode of Preparation Example 9 of the present disclosure. The scale bars of FIG. 9A and FIG. 9B are 1 μm and 5 μm, respectively.
Figure 9B:
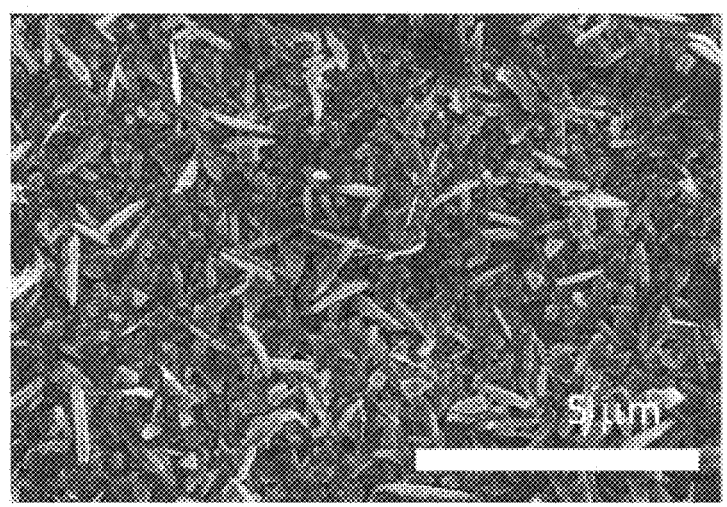

The surface morphology of the ninth electrode is analyzed by SEM (Hitachi SU-8010). Referring to FIG. 9A and FIG. 9B, the results show that the surface of the ninth electrode has particles and a sheet structure.

Figure 9C:
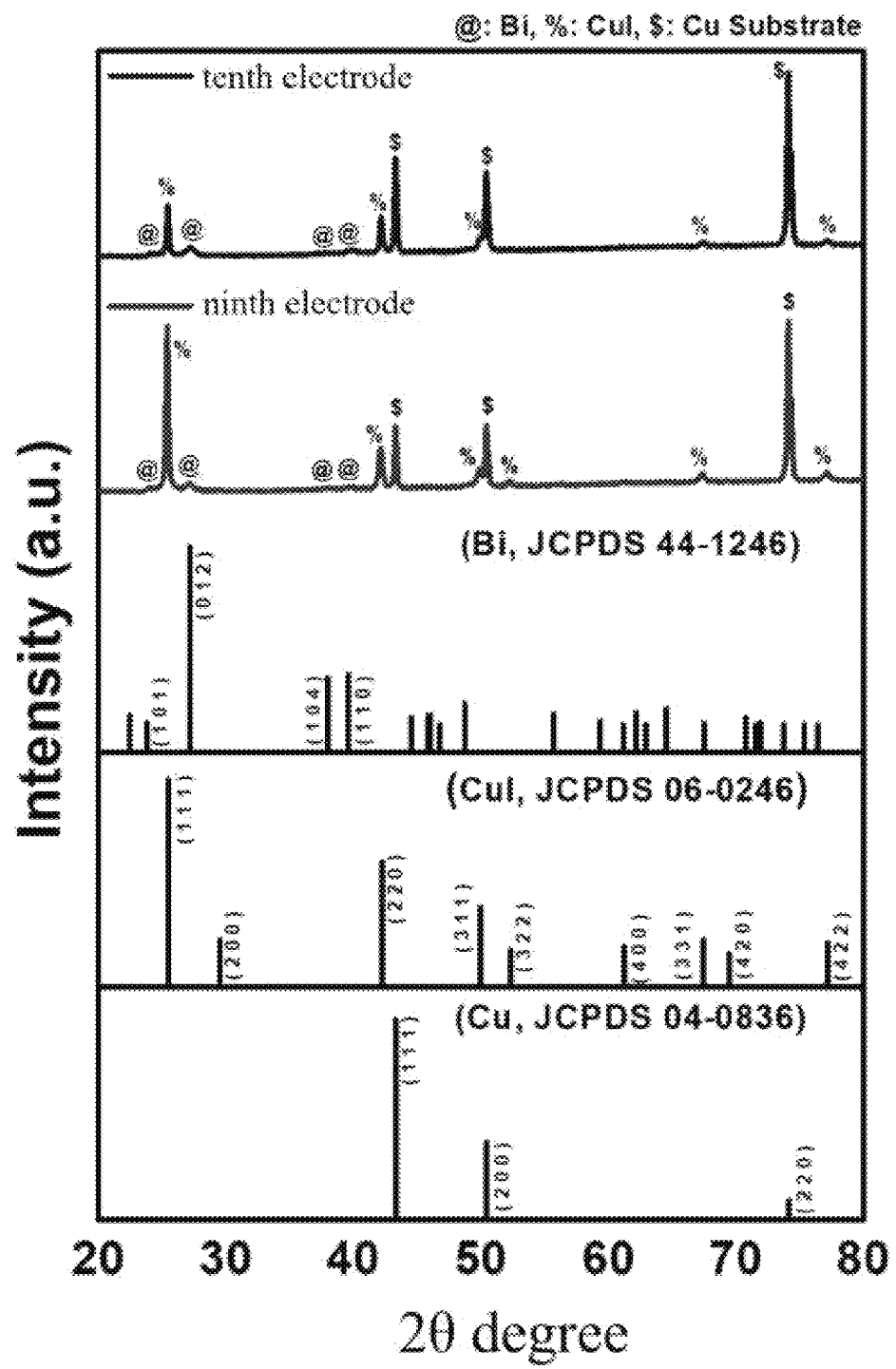
FIG. 9C shows the results of X-ray diffraction patterns of the ninth electrode of Preparation Example 9 and a tenth electrode of Preparation Example 10 of the present disclosure.

The crystal plane of the ninth electrode is analyzed by XRD. Referring to FIG. 9C, the result shows that the ninth electrode has characteristic peaks of CuI and metallic bismuth.

Preparation Example 10: Preparation of a Tenth Electrode by Electroless Plating Method The copper substrate is immersed in an aqueous solution containing 40 mM $Bi(NO_3)_3$, 0.4 M KI, and 5 mM 2,2'-azino-bis(3-ethylbenzthiazoline-6-sulfonic acid) diammonium salt (ABTS) in an aqueous solution for 4 minutes to obtain a bismuth-based modified electrode with a sheet structure containing CuI and metallic bismuth (i.e., the tenth electrode).

Figure 10A:
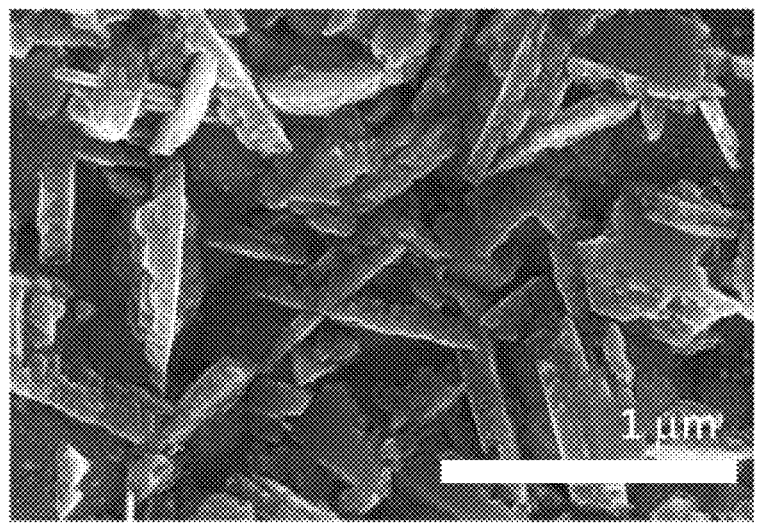
FIG. 10A and FIG. 10B respectively show the result of a surface morphology of the tenth electrode of Preparation Example 10 of the present disclosure. The scale bars of FIG. 10A and FIG. 10B are 1 μm and 5 μm, respectively.
Figure 10B:
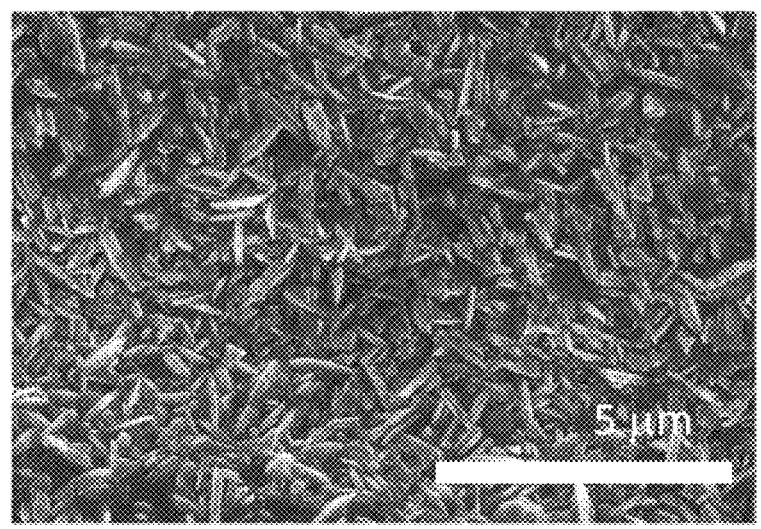

The surface morphology of the tenth electrode is analyzed by SEM (Hitachi SU-8010). Referring to FIG. 10A and FIG. 10B, the results show that the surface of the tenth electrode has submicron-sized particles and a sheet structure.

The crystal plane of the tenth electrode is analyzed by XRD. Referring to FIG. 9C, the result shows that the tenth electrode has characteristic peaks of CuI and metallic bismuth.

Preparation Example 11: Preparation of an Eleventh Electrode by Electroless Plating Method The copper substrate is immersed in an aqueous solution containing 40 mM $Bi(NO_3)_3$ and 0.4 M KI for 4 minutes to obtain a bismuth-based modified electrode with a bulk structure (i.e., the eleventh electrode). The composition on the surface of the eleventh electrode comprises CuI and metallic bismuth.

Figure 11A:
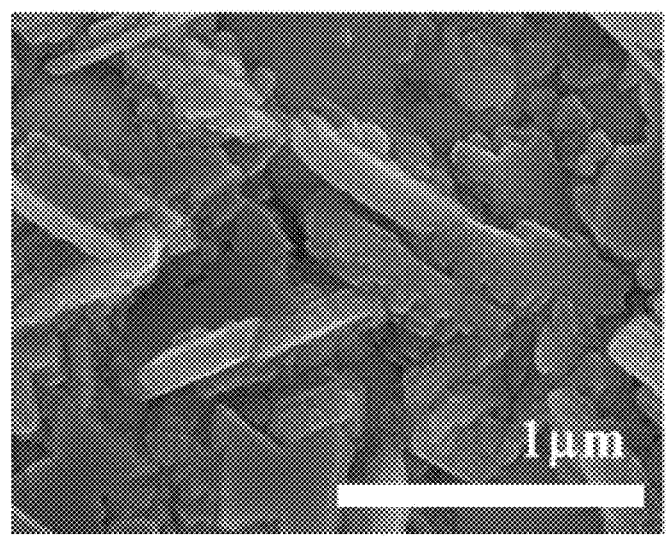
FIG. 11A shows the result of a surface morphology of an eleventh electrode of Preparation Example 11 of the present disclosure.

The surface morphology of the eleventh electrode is analyzed by SEM (Hitachi SU-8010). Referring to FIG. 11A, the result shows that the surface of the eleventh electrode has submicron-sized particles and a bulk structure.

Figure 11B:
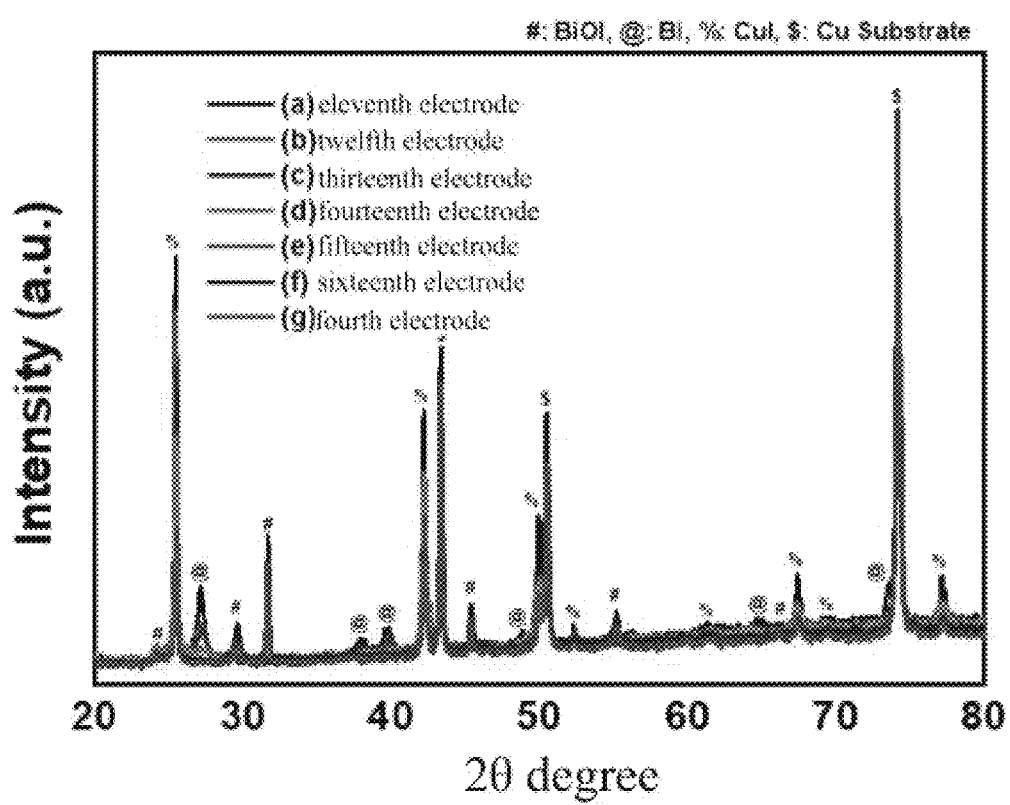
FIG. 11B shows the results of X-ray diffraction patterns of the fourth electrode of Preparation Example 4, the eleventh electrode of Preparation Example 11, and a twelfth electrode, a thirteenth electrode, a fourteenth electrode, a fifteenth electrode, and a sixteenth electrode of Preparation Example 12 of the present disclosure.
Figure 12A:
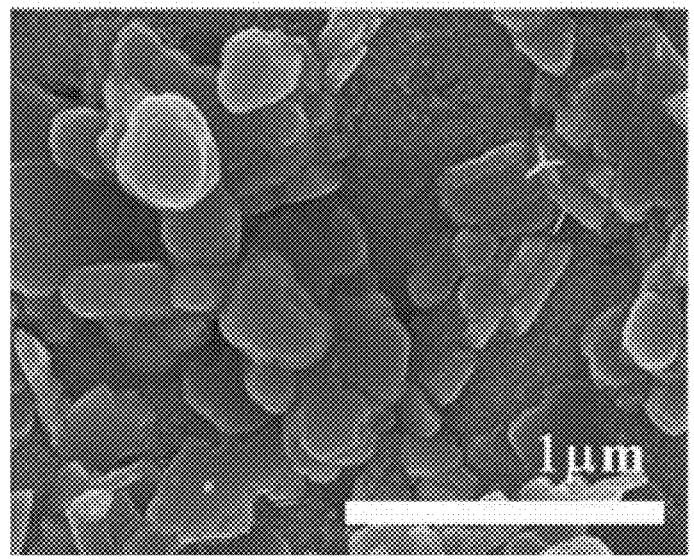
FIG. 12A to FIG. 12E respectively show the result of a surface morphology of the twelfth electrode, the thirteenth electrode, the fourteenth electrode, the fifteenth electrode, and the sixteenth electrode of Preparation Example 12 of the present disclosure.
Figure 12B:
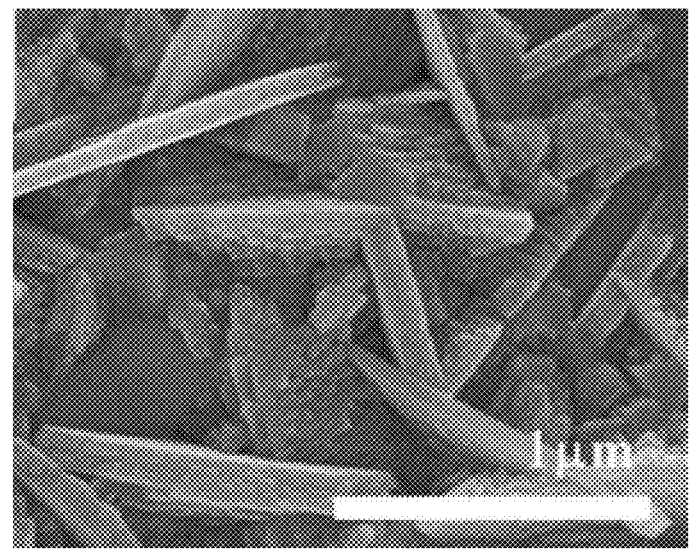
Figure 12C:
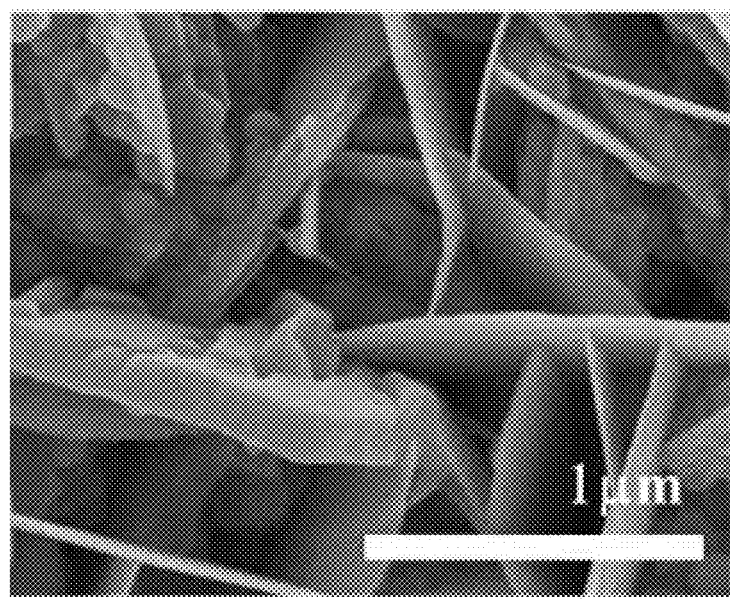
Figure 12D:
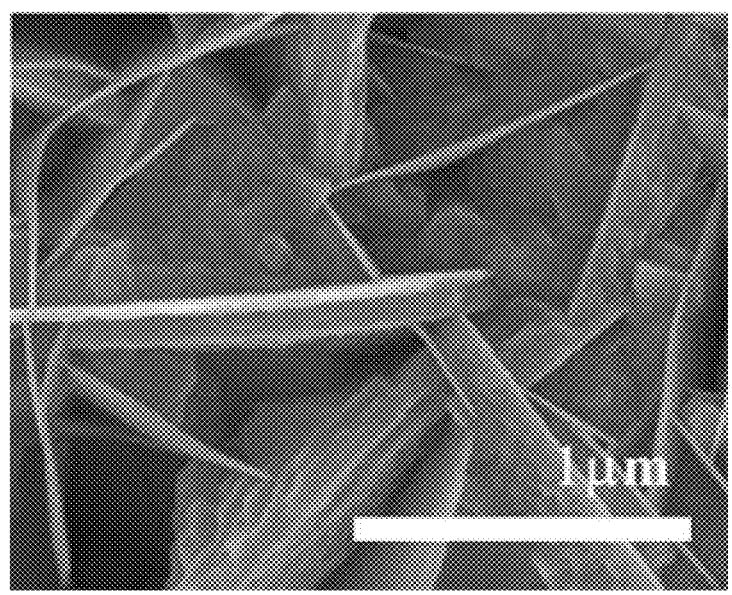
Figure 12E:
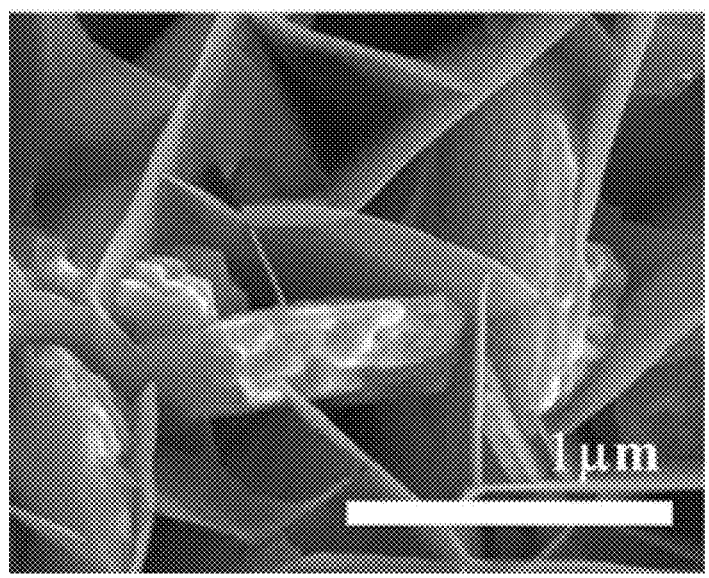

The crystal plane of the eleventh electrode is analyzed by XRD. Referring to FIG. 11B, the result shows that the eleventh electrode has characteristic peaks of CuI and metallic bismuth. In addition, the contents of CuI and metallic bismuth deposited on the surface of the eleventh electrode are shown in Table 2.

TABLE 2

| | The chemical composition of the eleventh electrode | | | |
| --- | --- | --- | --- | --- |
| | Content (%) | | | |
| | copper | CuI | BiOI | metallic bismuth |
| eleventh electrode | 50.0 | 34.8 | 0 | 15.3 |

Preparation Example 12: Preparation of a Twelfth Electrode, a Thirteenth Electrode, a Fourteenth Electrode, a Fifteenth Electrode, and a Sixteenth Electrode by Electroless Plating Method The copper substrate is immersed in an aqueous solution containing 40 mM $Bi(NO_3)_3$, 0.4 M KI, and p-benzoquinone with various concentrations, including 0.5 mM, 5 mM, 10 mM, 20 mM, and 40 mM for 4 minutes to obtain a bismuth-based modified electrodes with particles and a sheet structure (i.e., the twelfth electrode, the thirteenth electrode, the fourteenth electrode, the fifteenth electrode, and the sixteenth electrode, respectively).

The surface morphology of the twelfth electrode, the thirteenth electrode, the fourteenth electrode, the fifteenth electrode, and the sixteenth electrode are analyzed by SEM (Hitachi SU-8010). Referring to FIG. 12A to FIG. 12E, the results show that the surface of the twelfth electrode has particles, while the surfaces of the thirteenth electrode, the fourteenth electrode, the fifteenth electrode, and the sixteenth electrode have sheet structures.

The crystal planes of the twelfth electrode, the thirteenth electrode, the fourteenth electrode, the fifteenth electrode, and the sixteenth electrode are analyzed by XRD. Referring to FIG. 11B, the result shows that the twelfth electrode and the thirteenth electrode have characteristic peaks of CuI and metallic bismuth. In addition, the fourteenth electrode has characteristic peaks of CuI, BiOI, and metallic bismuth. Furthermore, the fifteenth electrode and the sixteenth electrode have characteristic peaks of CuI and BiOI. The content percentages of CuI, BiOI, and metallic bismuth deposited on the twelfth electrode, the third electrode, the fourteenth electrode, the fifteenth electrode, and the sixteenth electrode are shown in Table 3.

TABLE 3

Content percentages of CuI, BiOI, and metallic bismuth deposited on the twelfth electrode, the thirteenth electrode, the fourteenth electrode, the fifteenth electrode, and the sixteenth electrode

| | Content (%) | | | |
|---|---|---|---|---|
| | copper | CuI | BiOI | metallic bismuth |
| twelfth electrode | 49.2 | 41.4 | 0 | 9.4 |
| thirteenth electrode | 50.6 | 43.9 | 0 | 5.5 |
| fourteenth electrode | 61.9 | 35.7 | 1.3 | 1.1 |
| fifteenth electrode | 71.8 | 22.8 | 5.4 | 0 |
| sixteenth electrode | 70.0 | 19.7 | 10.3 | 0 |

Preparation Example 13: Preparation of a Seventeenth Electrode, an Eighteenth Electrode, a Nineteenth Electrode, and a Twentieth Electrode by Electroless Plating The copper substrate is immersed in an aqueous solution containing 40 mM $Bi(NO_3)_3$, 0.4 M KI, and 50 mM p-benzoquinone for 1 minute, 2 minutes, 10 minutes, and 20 minutes to obtain a bismuth-based modified electrode with a nanosheet structure (i.e., the seventeenth electrode, the eighteenth electrode, the nineteenth electrode, and the twentieth electrode, respectively). The compositions on the surfaces of the seventeenth electrode, the eighteenth electrode, the nineteenth electrode, and the twentieth electrode comprise BiOI and CuI.

The surface morphologies of the seventeenth electrode, the eighteenth electrode, the nineteenth electrode, and the twentieth electrode are analyzed by SEM (Hitachi SU-8010). Referring to FIG. 17A to FIG. 17D, the results show that the surfaces of the seventeenth electrode, the eighteenth electrode, and the nineteenth electrode have a nanosheet structure and nanoparticles dispersed on the nanosheet structure, and the surface of the twentieth electrode has a bulk structure with submicron size.

Figure 17A:
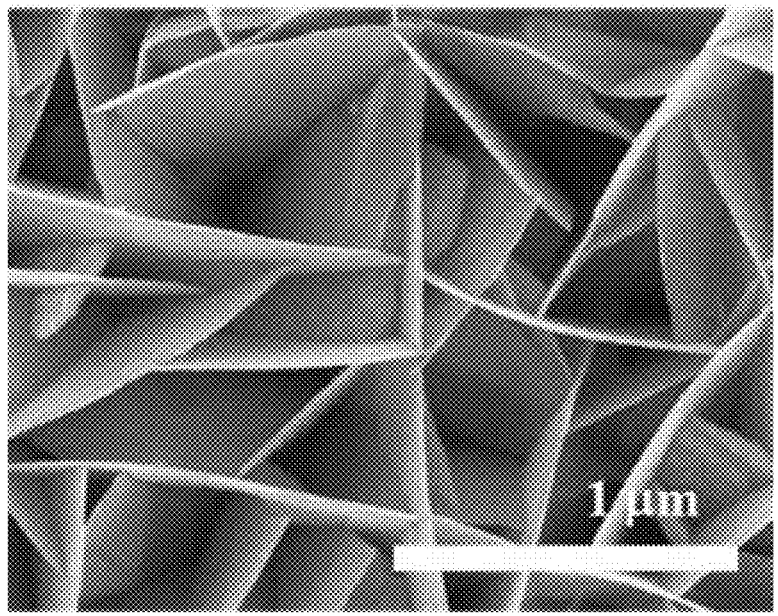
FIG. 17A to FIG. 17D respectively show the result of a surface morphology of the seventeenth electrode, the eighteenth electrode, the nineteenth electrode, and the twentieth electrode of Preparation Example 13 of the present disclosure.
Figure 17B:
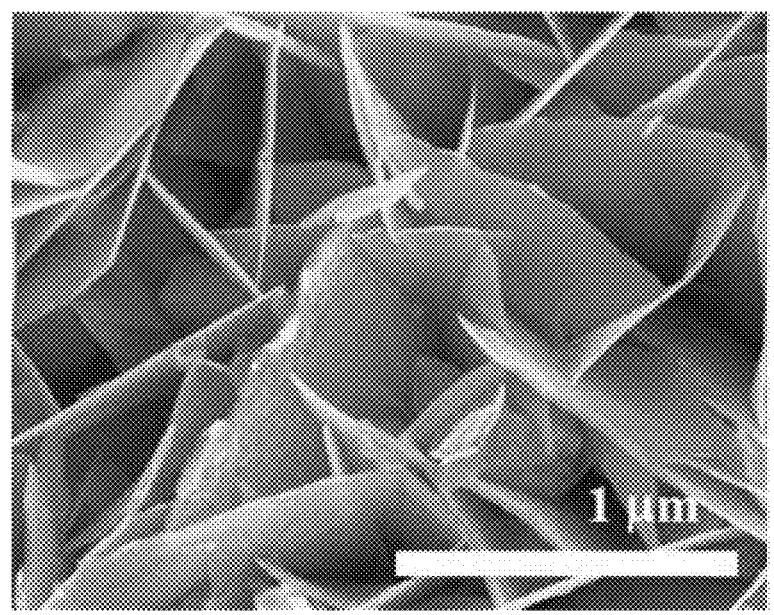
Figure 17C:
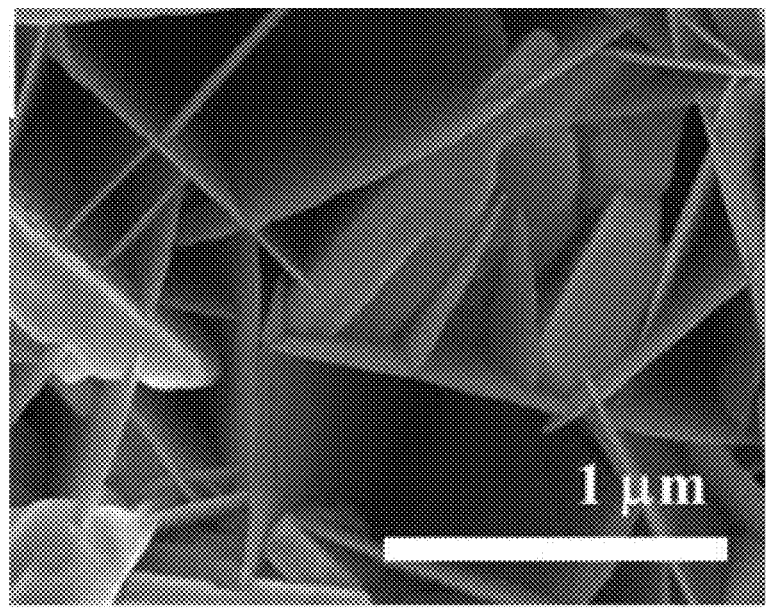
Figure 17D:
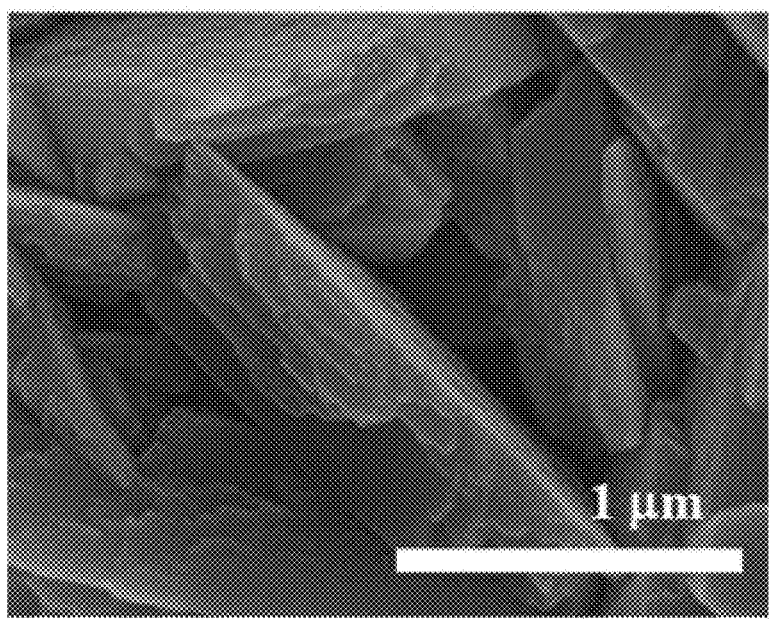
Figure 17E:
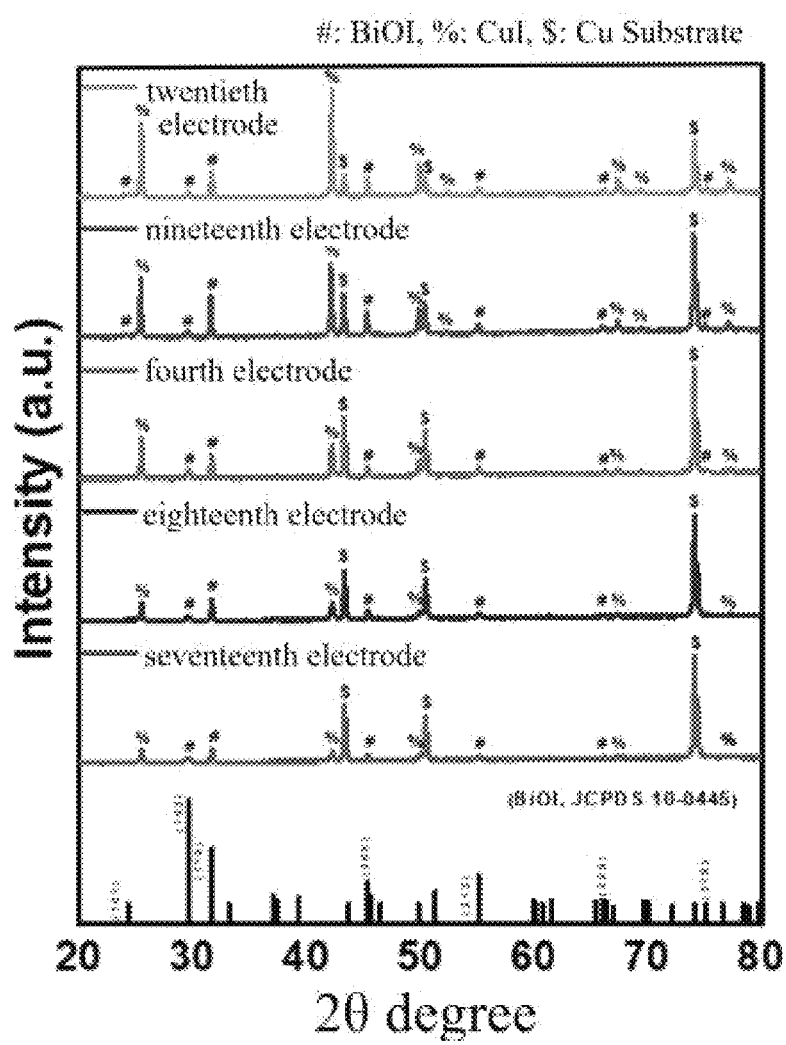
FIG. 17E shows the results of X-ray diffraction patterns of the fourth electrode of Preparation Example 4, and the seventeenth electrode, the eighteenth electrode, the nineteenth electrode, and the twentieth electrode of Preparation Example 13 of the present disclosure.

The crystal planes of the seventeenth electrode, the eighteenth electrode, the nineteenth electrode, and the twentieth electrode are analyzed by XRD. Referring to FIG. 17E, the result shows that the seventeenth electrode, the eighteenth electrode, the nineteenth electrode, and the twentieth electrode have characteristic peaks of CuI and BiOI.

Figure 13A:
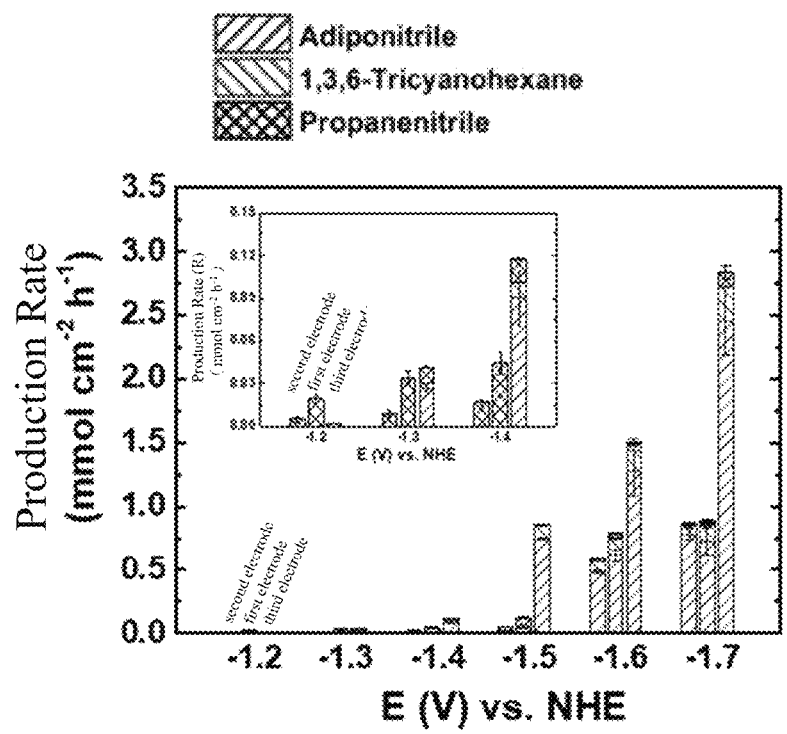
FIG. 13A shows the results of production rate (R) obtained by electrolysis of the products of the first electrode, the second electrode, and the third electrode of Example 1 of the present disclosure at an applied potential between −1.2 V and −1.7 V vs. NHE for 2 hours.
Figure 13B:
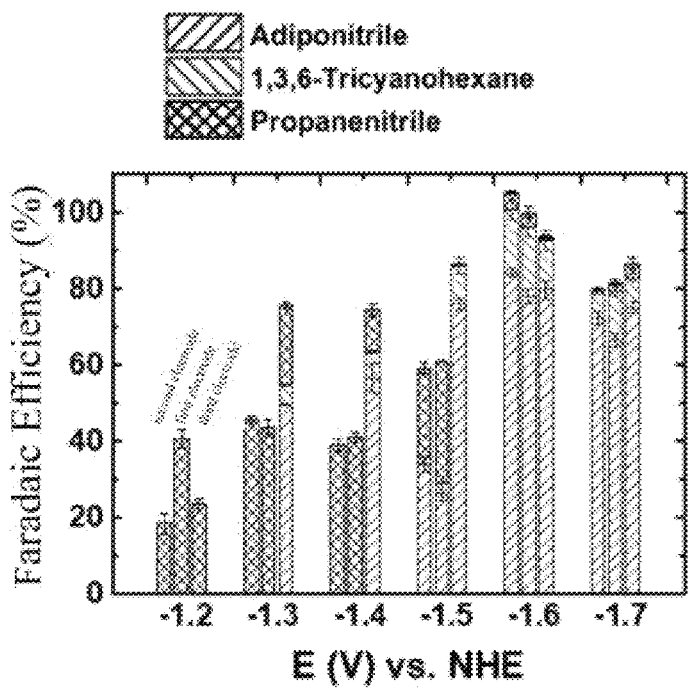
FIG. 13B shows the results of faradaic efficiency obtained by electrolysis of the products of the first electrode, the second electrode, and the third electrode of Example 1 of the present disclosure at an applied potential between −1.2 V and −1.7 V vs. NHE for 2 hours.
Figure 13C:
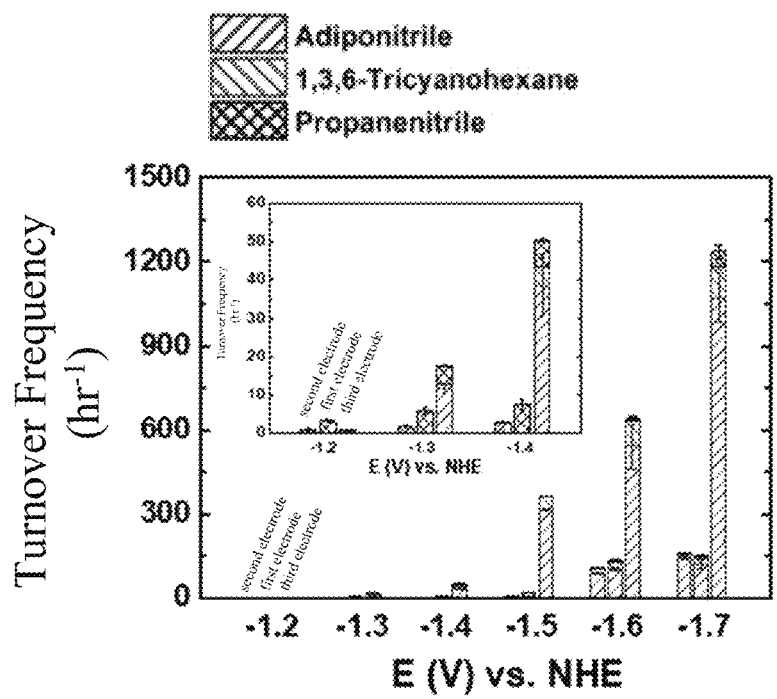
FIG. 13C shows the results of turnover frequency (TOF) obtained by electrolysis of the products of the first electrode, the second electrode, and the third electrode of Example 1 of the present disclosure at an applied potential between −1.2 V and −1.7 V vs. NHE for 2 hours.

Example 1: Characterization of the Electrocatalytic Performance of the First Electrode, the Second Electrode, the Third Electrode, and the Fifth Electrode The first electrode, the second electrode, and the third electrode are respectively immersed in a 0.5 M sodium phosphate solution (pH 8) containing 30 mM tetrabutylammonium phosphate and 0.6 M acrylonitrile and subjected to constant potential electrolysis for 2 hours. The products are analyzed to characterize the electrocatalytic performance. Referring to FIG. 13A, FIG. 13B, and FIG. 13C, the results show that compared with the first electrode and the second electrode, the third electrode may generate the target product of adiponitrile at a low applied potential of −1.3 V vs. NHE. Moreover, the electrocatalytic performance indicators of the third electrode such as the production rate (R), faradaic efficiency, and turnover frequency (TOF) show the best results at each potential. It can be seen that the electrocatalytic performance may be enhanced by modifying the morphology of the bismuth-based electrocatalyst, and the bismuth-based modified electrode which can replace the highly toxic lead electrode may be obtained.

Figure 14A:
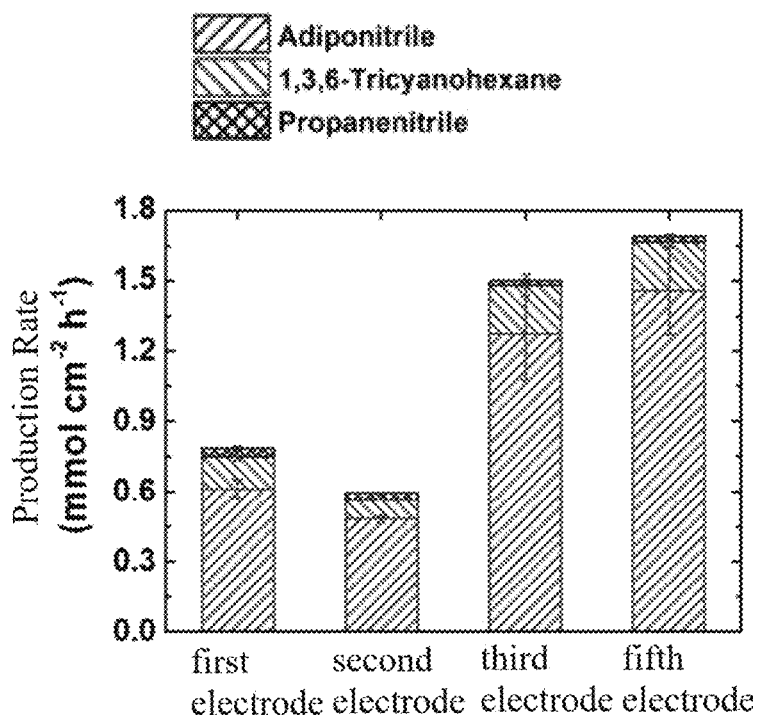
FIG. 14A shows the results of production rate (R) obtained by electrolysis of the products of the first electrode, the second electrode, the third electrode, and the fifth electrode of Example 1 of the present disclosure at an applied potential of −1.6 V vs. NHE for 2 hours.
Figure 14B:
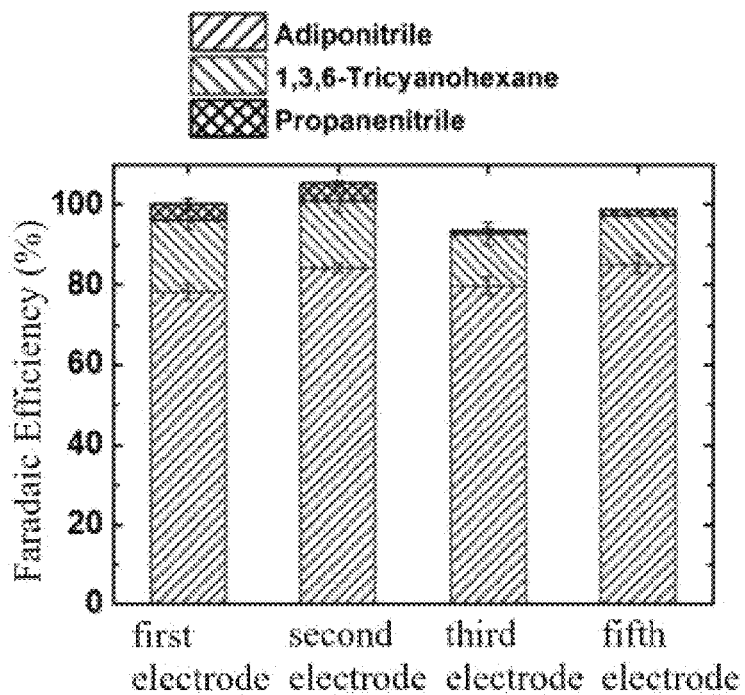
FIG. 14B shows the results of faradaic efficiency obtained by electrolysis of the products of the first electrode, the second electrode, the third electrode, and the fifth electrode of Example 1 of the present disclosure at an applied potential of −1.6 V vs. NHE for 2 hours.
Figure 14C:
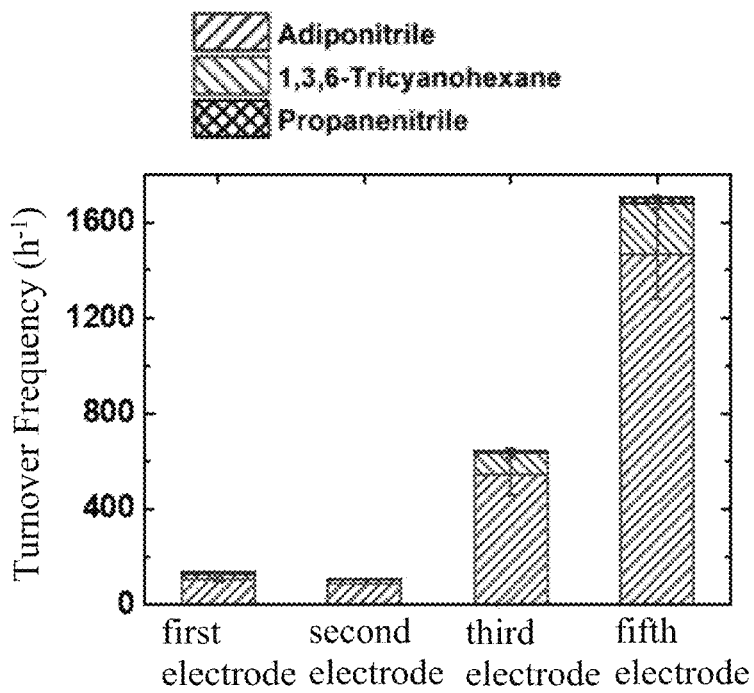
FIG. 14C shows the results of turnover frequency (TOF) obtained by electrolysis of the products of the first electrode, the second electrode, the third electrode, and the fifth electrode of Example 1 of the present disclosure at an applied potential of −1.6 V vs. NHE for 2 hours.

From the above, it can be seen that the third electrode which exhibits the highest faradaic efficiency under may be obtained by the electrolysis reaction at the applied potential of −1.6 V vs. NHE for 2 hours. Accordingly, the electrocatalytic performances of the first electrode, the second electrode, the third electrode, and the fifth electrode are further compared at the applied potential of −1.6 V vs. NHE. The first electrode, the second electrode, the third electrode, and the fifth electrode are respectively immersed in a 0.5 M sodium phosphate solution (pH 8) containing 30 mM tetrabutylammonium phosphate and 0.6 M acrylonitrile, and subjected to constant potential electrolysis for 2 hours. The products are then analyzed. Referring to FIG. 14A, FIG. 14B, and FIG. 14C, the results show that there is no significant difference in the faradaic efficiencies of the first electrode, the second electrode, the third electrode, and the fifth electrode. However, the analyses of production rate (R) and turnover frequency (TOF) reveal that the electrocatalytic performance of the third electrode and the fifth electrode is significantly better than that of the first electrode. In addition, the fifth electrode has the best electrocatalytic performance among these three electrodes. The results show that the bismuth-based modified electrode with a nanosheet structure may be rapidly prepared by the manufacturing processes of Preparation Example 4 and Preparation Example 5, and the prepared bismuth-based modified electrode with a nanosheet structure has high electrocatalytic performance.

Figure 15A:
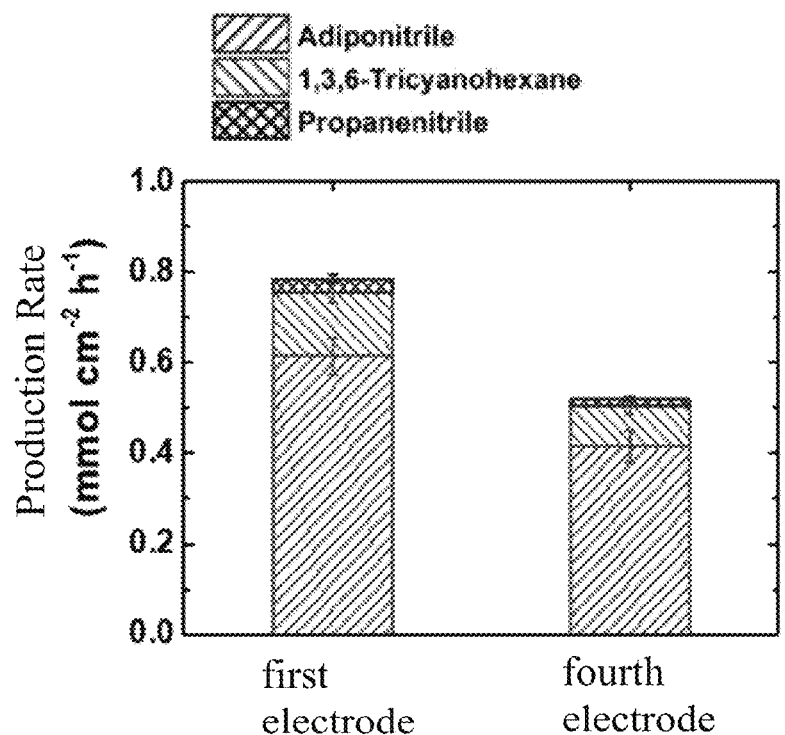
FIG. 15A shows the results of production rate (R) obtained by electrolysis of the products of the first electrode and the fourth electrode of Example 2 of the present disclosure at an applied potential of −1.6 V vs. NHE for 2 hours.
Figure 15B:
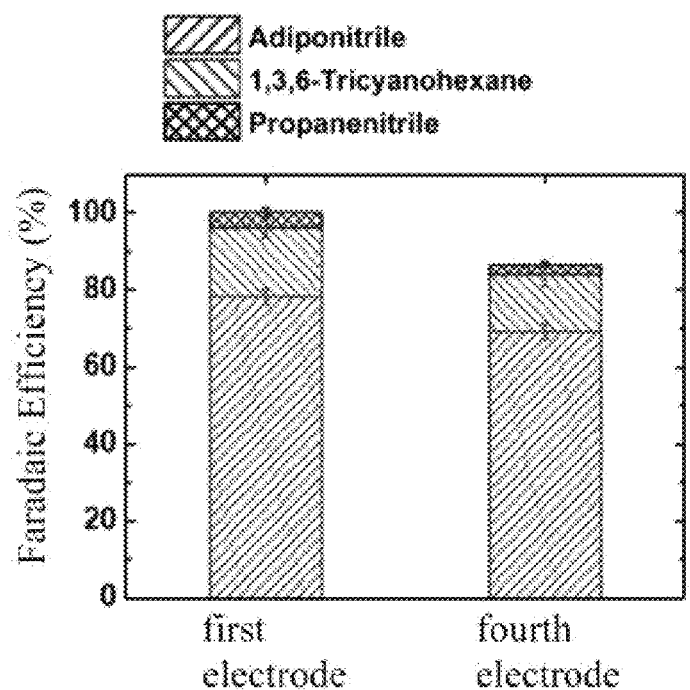
FIG. 15B shows the results of faradaic efficiency obtained by electrolysis of the products of the first electrode and the fourth electrode of Example 2 of the present disclosure at an applied potential of −1.6 V vs. NHE for 2 hours.
Figure 15C:
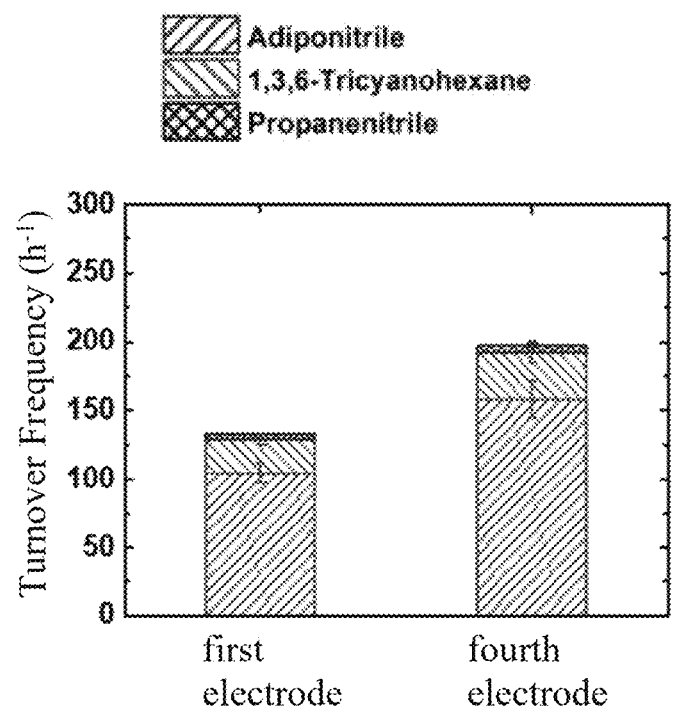
FIG. 15C shows the results of turnover frequency (TOF) obtained by electrolysis of the products of the first electrode and the fourth electrode of Example 2 of the present disclosure at an applied potential of −1.6 V vs. NHE for 2 hours.

Example 2: Characterization of the Electrocatalytic Performance of the First Electrode and the Fourth Electrode The electrocatalytic performance of the first electrode and the fourth are characterized at the potential of −1.6 V vs. NHE. The first electrode and the fourth electrode are respectively immersed in a 0.5 M sodium phosphate solution (pH 8) containing 30 mM tetrabutylammonium phosphate and 0.6 M acrylonitrile and subjected to constant potential electrolysis for 2 hours. The products are analyzed to characterize the electrocatalytic performance. Referring to FIG. 15A, FIG. 15B, and FIG. 15C, the results show that the turnover frequency (TOF) of adiponitrile generated by the fourth electrode is higher than that of the first electrode (177.7 vs. 104.7 $h^{-1}$). Thus, the results show that the bismuth-based modified electrode with a nanosheet structure having BiOI and CuI prepared by the Preparation Example 4 has high electrocatalytic performance and may replace the highly toxic lead.

Example 3: Characterization of the Electrocatalytic Performance of the Fourth Electrode, the Ninth Electrode, and the Tenth Electrode The electrocatalytic performances of the fourth electrode, the ninth electrode, and the tenth electrode are characterized at the potential of −1.6 V vs. NHE. The fourth electrode, the ninth electrode, and the tenth electrode are respectively immersed in a 0.5 M sodium phosphate solution (pH 8) containing 30 mM tetrabutylammonium phosphate and 0.6

Figure 16A:
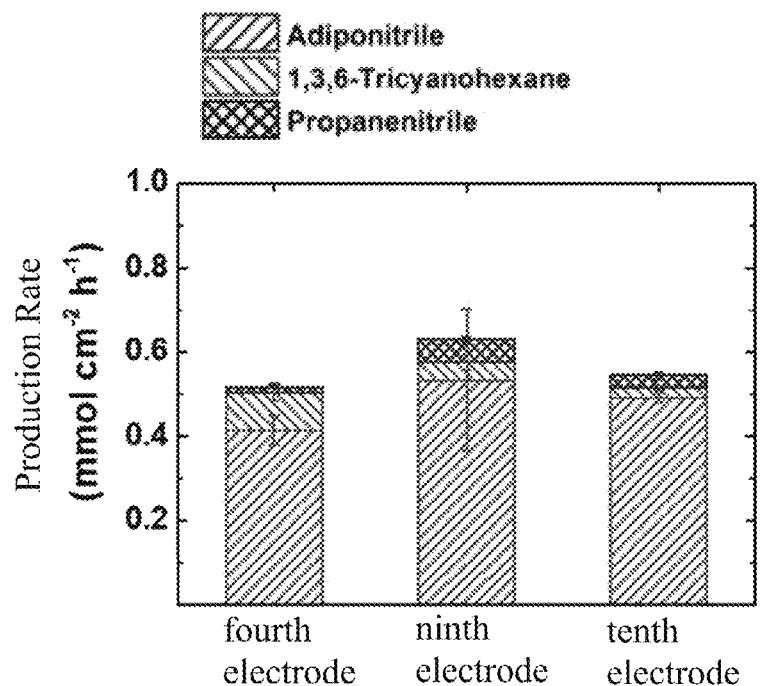
FIG. 16A shows the results of production rate (R) obtained by electrolysis of the products of the fourth electrode, the nineth electrode, and the tenth electrode of Example 3 of the present disclosure at an applied potential of −1.6 V vs. NHE for 2 hours.
Figure 16B:
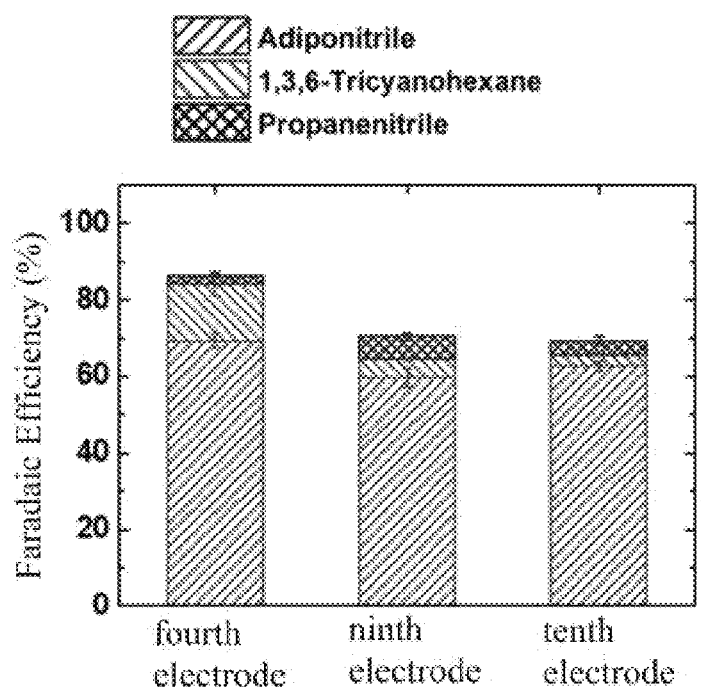
FIG. 16B shows the results of faradaic efficiency obtained by electrolysis of the products of the fourth electrode, the nineth electrode, and the tenth electrode of Example 3 of the present disclosure at an applied potential of −1.6 V vs. NHE for 2 hours.
Figure 16C:
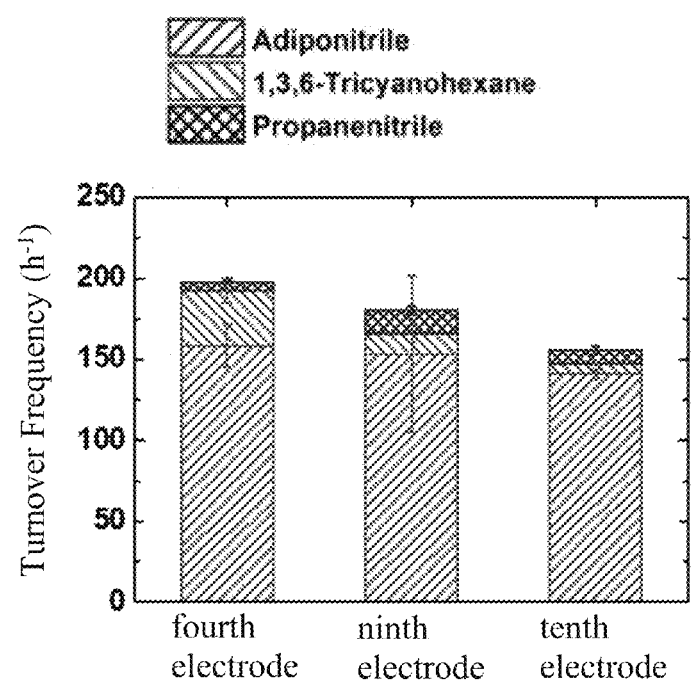
FIG. 16C shows the results of turnover frequency (TOF) obtained by electrolysis of the products of the fourth electrode, the nineth electrode, and the tenth electrode of Example 3 of the present disclosure at an applied potential of −1.6 V vs. NHE for 2 hours.

M acrylonitrile and subjected to constant potential electrolysis for 2 hours. The products are analyzed to characterized the electrocatalytic performance. Referring to FIG. 16A, FIG. 16B, and FIG. 16C, the results show that the faradaic efficiencies of the adiponitrile produced by the fourth electrode, the ninth electrode, and the eleventh electrode may reach 60%. Based on the above results, the present disclosure may easily and quickly manufacture a bismuth-based modified electrode having a nano-sheet structure with low toxicity and large area by electroless plating method, and the composition of the elements deposited on the surface of the bismuth substrate may be changed by using different types of oxidizing agents and adjusting the concentration of the oxidizing agent in the aqueous solution in which the copper substrate is immersed. For example, when the concentration of p-benzoquinone is greater than 10 mM, the surface of the bismuth-based modified electrode has CuI and BiOI. When the concentration of p-benzoquinone is equal to 10 mM, the surface of the bismuth-based modified electrode has CuI, BiOI, and metallic bismuth. When the concentration of p-benzoquinone is between 0.1 mM and 9 mM, the surface of the bismuth-based modified electrode has CuI and metallic bismuth. In addition, CuI and BiOI may also be formed on the surface of the bismuth-based modified electrode by immersing the copper substrate in the aqueous solution containing the oxidizing agent for 1 to 20 minutes. Furthermore, the bismuth-based modified electrode prepared by the present disclosure may be used for the electrohydrodimerization of acrylonitrile to synthesize adiponitrile.

The above provides a detailed introduction to the implementation of the present disclosure, and specific examples are used herein to describe the principles and implementations of the present disclosure, and the description of the implementations above is merely used to help understand the present disclosure. Moreover, for those skilled in the art, according to a concept of the present disclosure, there will be changes in the specific embodiment and the scope of present disclosure. In summary, the content of the specification should not be construed as a limitation to the present disclosure.

What is claimed is:

1. A method of manufacturing a bismuth-based modified electrode, comprising a step of:

immersing a copper substrate in an aqueous solution for 1 to 20 minutes to obtain the bismuth-based modified electrode;

wherein the aqueous solution comprises a bismuth solution and KI solution, and a concentration of the KI solution ranges from 0.4 M to 3.0 M, and the bismuth solution comprises bismuth nitrate, bismuth carbonate, bismuth acetate, or bismuth citrate, and a concentration of the bismuth nitrate, a concentration of the bismuth carbonate, a concentration of the bismuth acetate, and a concentration of the bismuth citrate range from 20 mM to 40 mM, respectively, wherein the aqueous solution further comprises an oxidizing agent and the oxidizing agent comprises p-benzoquinone with a concentration between 0.5 mM and 50 mM, hydrogen peroxide with a concentration between 1 mM and 10 mM, or 2,2'-azino-bis(3-ethylbenzthiazoline-6-sulfonic acid) diammonium salt with a concentration between 1 mM and 10 mM; and immersing the copper substrate in an electrolyte with a concentration of 0.1 M and a pH between 7.0 and 9.2, and performing an electrochemical reduction at an applied potential between −0.5 V and −1.75 V vs. NHE for 30 minutes to 2 hours, wherein the electrolyte is selected from the group consisting of phosphate solution, borate solution, and carbonate solution.

2. The method according to claim 1, wherein the concentration of the KI solution is 0.4 M, and the bismuth solution comprises 40 mM bismuth nitrate, 20 mM bismuth carbonate, 40 mM bismuth acetate, or 40 mM bismuth citrate.

3. The method according to claim 1, wherein the oxidizing agent comprises 50 mM p-benzoquinone, 5 mM hydrogen peroxide, or 5 mM 2,2'-azino-bis(3-ethylbenzothiazoline-6-sulfonic acid) diammonium salt.

4. The method according to claim 1, wherein the copper substrate is immersed in 0.1 M borate buffer, pH 9.2.

5. The method according to claim 1, wherein the electrochemical reduction is performed at the applied potential at −1.745 V vs. NHE for 30 minutes.

6. The method according to claim 1, wherein the copper substrate is immersed in the aqueous solution for 4 minutes.

* * * * *